US012656470B2

(12) United States Patent
Nakano et al.

(10) Patent No.: US 12,656,470 B2
(45) Date of Patent: Jun. 16, 2026

(54) COMMUNICATION DEVICE AND DISTANCE MEASUREMENT METHOD

(71) Applicant: Sony Semiconductor Solutions Corporation, Kanagawa (JP)

(72) Inventors: Hiroaki Nakano, Tokyo (JP); Satoshi Okada, Tokyo (JP); Shinichi Fukuda, Chiba (JP)

(73) Assignee: Sony Semiconductor Solutions Corporation, Kawagawa (JP)

( * ) Notice: Subject to any disclaimer, the term of this patent is extended or adjusted under 35 U.S.C. 154(b) by 293 days.

(21) Appl. No.: 18/555,490

(22) PCT Filed: Feb. 28, 2022

(86) PCT No.: PCT/JP2022/008280
§ 371 (c)(1),
(2) Date: Oct. 13, 2023

(87) PCT Pub. No.: WO2022/244369
PCT Pub. Date: Nov. 24, 2022

(65) Prior Publication Data
US 2024/0192345 A1 Jun. 13, 2024

(30) Foreign Application Priority Data
May 19, 2021 (JP) ................................. 2021-084747

(51) Int. Cl.
*G01S 11/02* (2010.01)

(52) U.S. Cl.
CPC ..................................... *G01S 11/02* (2013.01)

(58) Field of Classification Search
CPC . G01S 11/02; G01S 7/354; G01S 7/40; G01S 7/4017; G01S 13/84
(Continued)

(56) References Cited

U.S. PATENT DOCUMENTS 9,374,113 B2 * 6/2016 Greene ................ H04B 1/0458
11,108,596 B2 * 8/2021 Hadaschik ............ H04L 25/022
(Continued)

FOREIGN PATENT DOCUMENTS

EP 2602636 A1 6/2013
JP 2010223593 A 10/2010
(Continued)

OTHER PUBLICATIONS

Michael Gottinger, et al, "Coherent Full-Duplex Double-Sided Two-Way Ranging and Velocity Measurement Between Separate Incoherent Radio Units", IEEE Transactions on Microwave Theory and Techniques, vol. 67, No. 5, May 1, 2019, pp. 2045-2061, XP011723045.

(Continued)

*Primary Examiner* — Bo Fan
(74) *Attorney, Agent, or Firm* — Michael Best & Friedrich LLP

(57) ABSTRACT

An object of the present invention is to improve distance measurement accuracy in a case where there is a change in distance between communication devices in a case where distance measurement is performed by a phase based method. A communication device (1) according to the present invention includes a phase characteristic acquisition unit (F1) that acquires a phase characteristic with respect to a frequency of a signal propagation path with another communication device, and a distance calculation unit (F2) that calculates a distance to the another communication device on the basis of the phase characteristic, in which the phase characteristic acquisition unit (F1) acquires the phase characteristic by changing the frequency by a frequency change pattern including at least an upward-side change and a downward-side change.

20 Claims, 16 Drawing Sheets

(58) Field of Classification Search
USPC ........................... 342/458, 372, 174, 134, 22
See application file for complete search history.

(56) References Cited

U.S. PATENT DOCUMENTS

| | | | | |
|---|---|---|---|---|
| 2003/0195723 | A1 | 10/2003 | Bensky | |
| 2012/0056773 | A1* | 3/2012 | Sato ......................... | G01S 7/354 |
| | | | | 342/109 |
| 2015/0346332 | A1* | 12/2015 | Taylor, Jr. ............... | G01S 13/84 |
| | | | | 342/458 |
| 2019/0004145 | A1* | 1/2019 | Vossiek ................. | G01S 7/4021 |
| 2021/0080540 | A1* | 3/2021 | Vossiek ..................... | G01S 7/40 |

FOREIGN PATENT DOCUMENTS

| | | | |
|---|---|---|---|
| JP | 2012103162 | A | 5/2012 |
| JP | 2018048821 | A | 3/2018 |
| JP | 2018124181 | A | 8/2018 |
| JP | 2020134169 | A | 8/2020 |
| JP | 2020165696 | A | 10/2020 |

OTHER PUBLICATIONS

Sven Roehr, et al, "Wireless Local Positioning—Existing Solutions and Novel System Concepts", 2015 IEEE MTT-S International Conference on Microwaves for Intelligent Mobility, Apr. 27, 2015, pp. 1-4, XP032783381.
International Search Report (PCT/ISA/210), International Application No. PCT/JP2022/008280, dated May 17, 2022.

\* cited by examiner

| 2400 | 2480 | 2410 | 2470 | 2420 | 2460 | 2430 | 2450 | 2440 | 2450 | 2450 | 2430 | 2460 | 2420 | 2470 | 2410 | 2480 | 2400 |
|------|------|------|------|------|------|------|------|------|------|------|------|------|------|------|------|------|------|

B

| 2404 to 2478 (EXCLUDING 2426) | 2404 to 2478 (EXCLUDING 2426) |
|---|---|

C

| 2400 to 2404 | 2404 to 2476 | 2476 to 2480 | 2476 to 2480 | 2404 to 2476 | 2400 to 2404 |
|---|---|---|---|---|---|

D

| 2400 | 2402 | 2404 to 2476 | 2478 | 2480 | 2480 | 2478 | 2404 to 2476 | 2402 | 2400 |
|---|---|---|---|---|---|---|---|---|---|

COMMUNICATION DEVICE AND DISTANCE MEASUREMENT METHOD

TECHNICAL FIELD

The present technology relates to a communication device and a distance measurement method, and particularly relates to a technology for performing distance measurement on the basis of a phase characteristic with respect to a frequency of a signal propagation path with another communication device.

BACKGROUND ART

In recent years, indoor positioning technology has attracted attention. Since radio waves from satellites do not reach indoors, there is a problem that a signal of a global navigation satellite system (GNSS) such as a global positioning system (GPS) cannot be received, and various methods have been proposed. For example, there are Pedestrian Dead Reckoning (PDR) in which a motion and a movement amount of a user are measured by a plurality of sensors such as an acceleration sensor and a gyro sensor, a method of estimating a position by collation of geomagnetic data, a method of estimating a distance by a flight time from when light is projected to when light is received (Time of Flight (ToF)), and the like.

Note that the following patent documents can be cited as related conventional techniques.

CITATION LIST

Patent Document

Patent Document 1: Japanese Patent Application Laid-Open No. 2018-124181
Patent Document 2: Japanese Patent Application Laid-Open No. 2010-223593

SUMMARY OF THE INVENTION

Problems to be Solved by the Invention

However, for example, in the PDR method, a distance measurement error is accumulated, but there is no means for correcting the distance measurement error. In addition, in the method that requires data collation of geomagnetic data or the like, it is essential to create a preliminary map, and there is a large problem in terms of operation, for example, it is necessary to re-create the collation data again when the layout is changed or the map is changed. The ToF method is largely affected by shadowing (deterioration in distance measurement performance due to a human body), and there is a problem that a correct distance cannot be measured unless the environment is a line-of-sight environment.

In order to solve this problem, a distance measurement technique using a wireless signal has attracted more attention than before. A technology for performing distance measurement using wireless communication such as Bluetooth Low Energy (BLE: Bluetooth is a registered trademark), Wi-Fi (registered trademark), or Long Term Evolution (LTE) has already been proposed. These methods do not require preliminary learning or the like, and are easily developed into an application.

However, it is desired to further improve the distance measurement accuracy in the distance measurement technique using a wireless signal. Currently, a method of using a received signal strength indicator (RSSI) is being commercialized as a solution. This is a method of determining that it is close if the signal is large and it is far if the signal is small, but it is known that the signal is susceptible to multipath (reflected wave). Furthermore, there is a problem that a large error occurs in the received signal strength depending on the angle of the antenna.

As a method for solving these problems, a phase based method has attracted attention. The phase based method is a method of calculating a distance on the basis of a phase characteristic with respect to a frequency of a signal propagation path used for communication. Specifically, in the phase based method, wireless signal communication is performed between at least two communication devices while changing the frequency, and a phase characteristic with respect to the frequency of the signal propagation path is obtained.

However, in the phase based method, there is a possibility that a distance measurement error occurs in a case where the distance between the communication devices changes during the distance measurement.

The present technology has been made in view of the above circumstances, and an object thereof is to improve distance measurement accuracy in a case where there is a change in distance between communication devices in a case where distance measurement is performed by a phase based method.

Solutions to Problems

A communication device according to the present technology includes a phase characteristic acquisition unit that acquires a phase characteristic with respect to a frequency of a signal propagation path with another communication device, and a distance calculation unit that calculates a distance to the another communication device on the basis of the phase characteristic, in which the phase characteristic acquisition unit acquires the phase characteristic by changing the frequency by a frequency change pattern including at least an upward-side change and a downward-side change.

The phase characteristic obtained by changing the frequency on the upward side and the phase characteristic obtained by changing the frequency on the downward side show a difference corresponding to a distance change with respect to other communication devices, and it is possible to appropriately obtain the distance in a case where there is a distance change by performing distance calculation based on the phase characteristic obtained by changing the frequency by the frequency change pattern including the upward change and the downward change as described above.

BRIEF DESCRIPTION OF DRAWINGS

FIG. 14 is a block diagram illustrating a configuration example of a communication device as a third embodiment.

FIG. 16 is an explanatory diagram of a modification of the frequency change pattern.

MODE FOR CARRYING OUT THE INVENTION

Hereinafter, embodiments according to the present technology will be described in the following order with reference to the accompanying drawings.

<1. First embodiment>
(1-1. Configuration of communication device)
(1-2. Distance measurement by phase based method and problems thereof)
(1-3. Distance measurement technique as first embodiment)
(1-4. Processing procedure)
(1-5. Distance measurement technique as modification of first embodiment)
<2. Second embodiment>
<3. Third embodiment>
<4. Modification>
<5. Summary of embodiment>
<6. Present technology>

1. First Embodiment

1-1. Configuration of Communication Device

Figure 1:
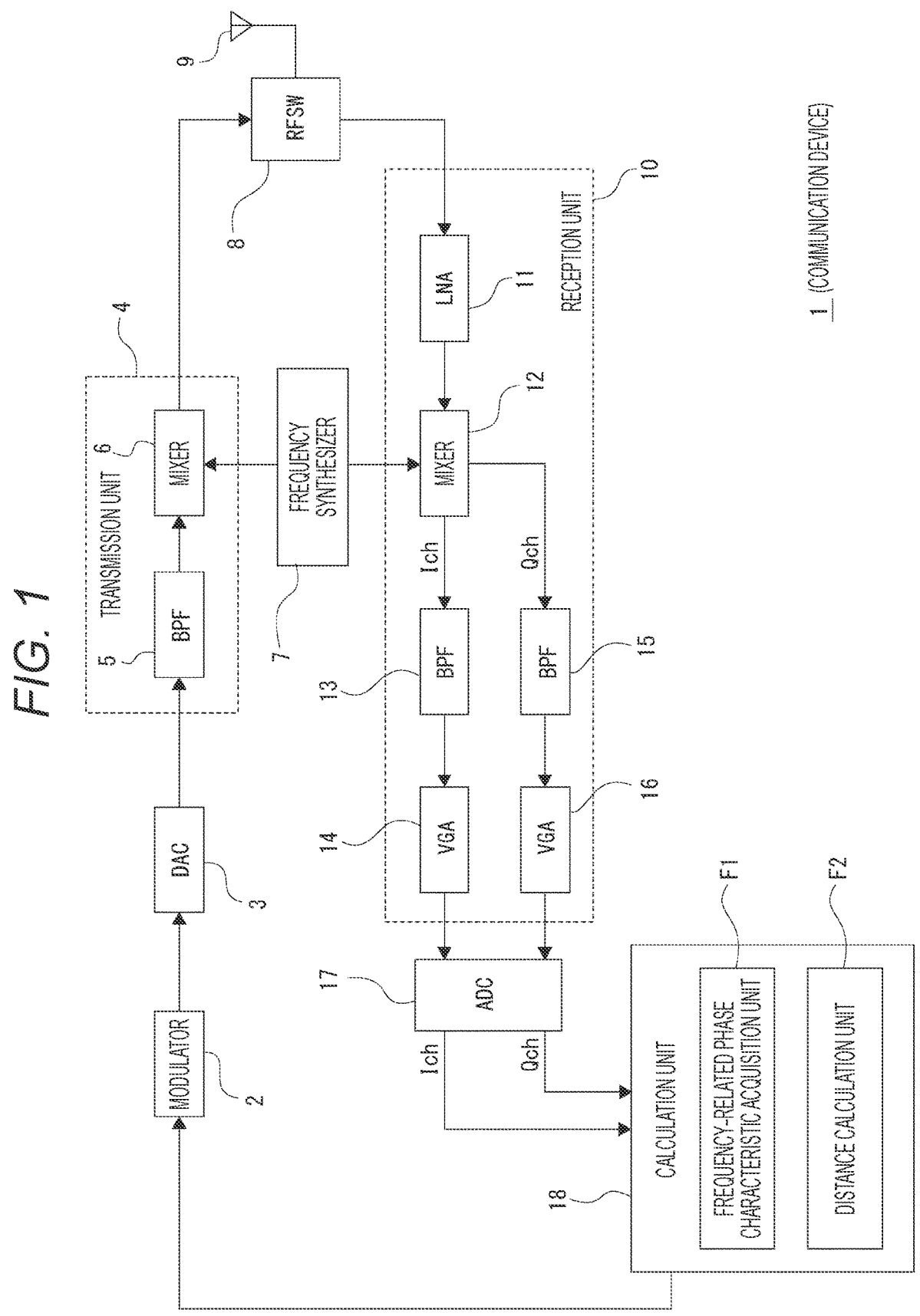
FIG. 1 is a block diagram illustrating a configuration example of a communication device as a first embodiment according to the present technology.

FIG. 1 is a block diagram illustrating a configuration example of a communication device 1 as a first embodiment according to the present technology.

As illustrated, the communication device 1 includes a modulator 2, a digital-to-analog converter (DAC) 3, a transmission unit 4, a frequency synthesizer 7, an RF switch (SW) 8, an antenna 9, a reception unit 10, an analog-to-digital converter (ADC) 17, and a calculation unit 18.

The communication device 1 in the present example can perform wireless communication according to, for example, a Bluetooth Low Energy (BLE: Bluetooth is a registered trademark) system. In the BLE method, it is possible to cut the time required for an operation requiring large power such as connection establishment and data communication as much as possible. Therefore, power consumption can be suppressed, and the communication device 1 can be downsized.

The modulator 2 performs a signal modulation process for performing wireless communication with another communication device 1. Here, as the modulation processing, for example, IQ modulation is performed. In the IQ modulation, each signal of an I channel (In-phase: in-phase component) and a Q channel (Quadrature: quadrature component) is used as a baseband signal.

The modulator 2 performs modulation processing as IQ modulation on data to be transmitted supplied from the calculation unit 18.

The DAC 3 converts the digital signal from the modulator 2 into an analog signal. The analog signal converted by the DAC 3 is supplied to the transmission unit 4.

The transmission unit 4 is a block that transmits a signal by wireless communication. As illustrated, the transmission unit 4 includes a band pass filter (BPF) 5 and a mixer 6. The BPF 5 passes only a signal of a specific frequency band. That is, the BPF 5 supplies only a signal of a specific frequency band to the mixer 6 with respect to the analog signal from the DAC 3.

The mixer 6 mixes a local oscillation frequency supplied from the frequency synthesizer 7 with the signal supplied from the BPF 5 to convert the signal into a transmission frequency of wireless communication.

The frequency synthesizer 7 supplies a frequency used for transmission and reception. Specifically, the frequency synthesizer 7 includes a local oscillator therein, and is used for conversion of a high-frequency signal and a baseband signal of wireless communication.

The RF switch 8 is a switch that switches a radio frequency (RF) signal. The RF switch 8 connects the transmission unit 4 to the antenna 9 at the time of transmission, and connects the reception unit 10 to the antenna 9 at the time of reception.

The antenna 9 is an antenna for transmitting and receiving signals by wireless communication.

The reception unit 10 is a block that receives a signal by wireless communication. As illustrated, the reception unit 10 includes a low noise amplifier (LNA) 11, a mixer 12, a BPF 13, a variable gain amplifier (VGA) 14, a BPF 15, and a VGA 16.

The LNA 11 amplifies the RF signal received by the antenna 9. The mixer 12 mixes the signal supplied from the LNA 11 with the local oscillation frequency supplied from the frequency synthesizer 7 to convert the signal into each of the I channel signal and the Q channel signal. The I channel signal (denoted as "Ich" in the drawing) is supplied to the BPF 13, and the Q channel signal (denoted as "Qch" in the drawing) is supplied to the BPF 15.

The I channel signal obtained by the mixer 12 is input to the BPF 13, and only a signal in a specific frequency band is extracted and supplied to the VGA 14. On the other hand, the Q channel signal obtained by the mixer 12 is input to the BPF 15, and only a signal in a specific frequency band is extracted and supplied to the VGA 16.

The VGA 14 and the VGA 16 function as analog variable gain amplifiers that adjust gains of the I channel signal supplied from the BPF 13 and the Q channel signal supplied from the BPF 15, respectively.

The ADC 17 converts the I channel signal and the Q channel signal from the reception unit 10, that is, the I channel signal and the Q channel signal output via the VGA 14 and the VGA 16 from analog signals to digital signals.

The I channel and Q channel signals converted into the digital signals are supplied to the calculation unit 18.

The calculation unit 18 includes, for example, a microcomputer including a central processing unit (CPU), a read only memory (ROM), and a random access memory (RAM), and the CPU executes various processes according to, for example, a program stored in the ROM or a program loaded from the ROM to the RAM.

For example, the calculation unit 18 performs a process of supplying data to be transmitted to the modulator 2 and modulating the data. Furthermore, the calculation unit 18 also performs a process of demodulating the received data on the basis of the data of the respective signals of the I channel and the Q channel supplied from the ADC 17, or the like.

In particular, the calculation unit 18 in the present example has functions as a frequency-related phase characteristic acquisition unit F1 and a distance calculation unit F2 illustrated in the drawing as functions for performing distance measurement using wireless communication.

The frequency-related phase characteristic acquisition unit F1 acquires a phase characteristic with respect to a frequency of a signal propagation path with another communication device 1.

In this example, in order to perform distance measurement by a phase based method as distance measurement using wireless communication, a process of acquiring a phase characteristic with respect to a frequency of a signal propagation path is performed.

Note that a method of distance measurement by the phase based method will be described later again.

The distance calculation unit F2 calculates the distance to the other communication device 1 on the basis of the phase characteristic with respect to the frequency of the signal propagation path acquired by the frequency-related phase characteristic acquisition unit F1. Note that a method of calculating the distance by the distance calculation unit F2 will also be described later.

1-2. Distance Measurement by Phase Based Method and Problems Thereof

Figure 2:
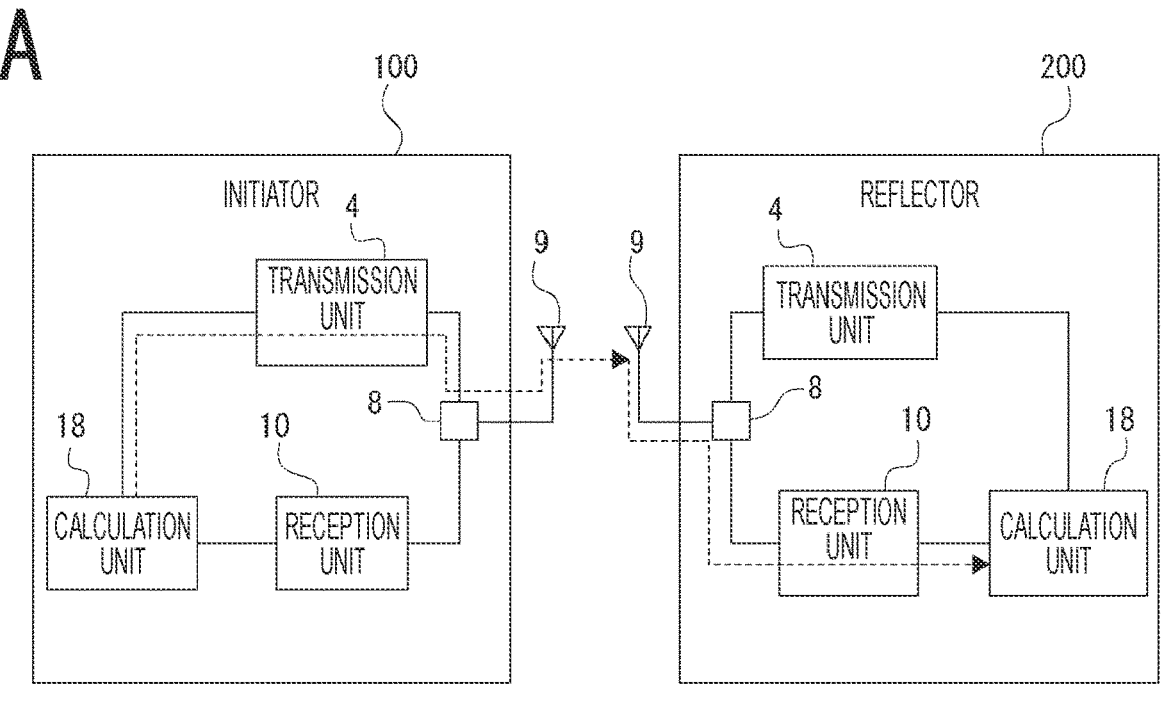
FIG. 2 is a diagram illustrating a mode example of phase measurement in a phase based method.
Figure 2:
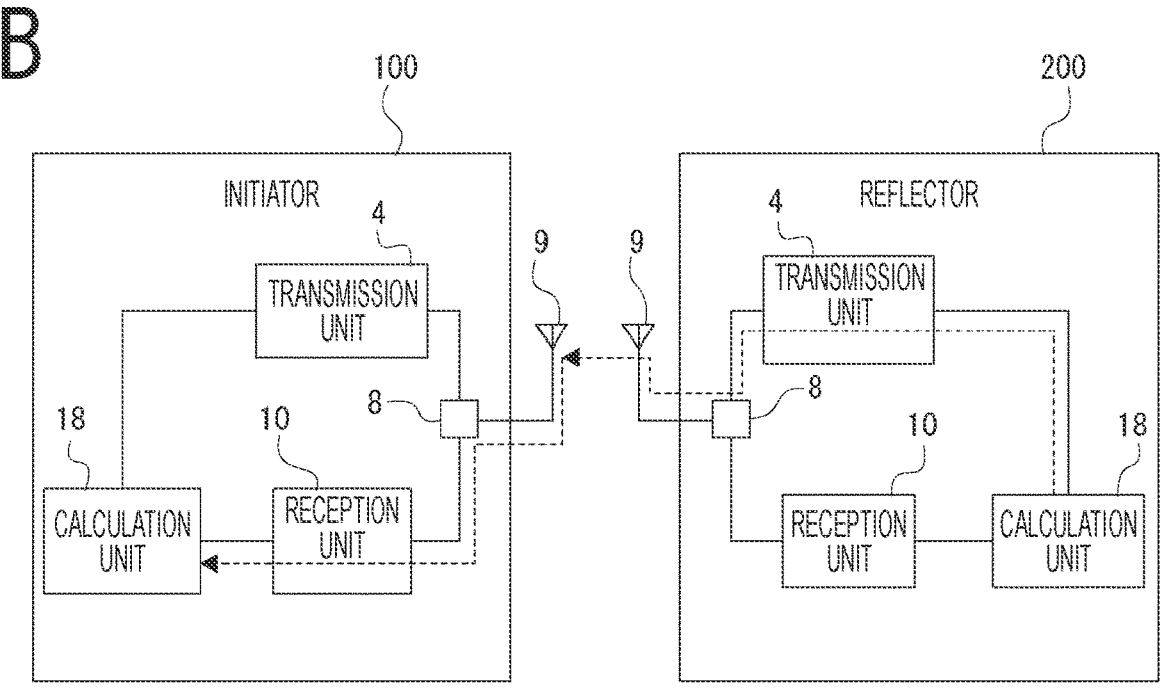

FIG. 2 is a diagram illustrating a mode example of phase measurement in the phase based method. In the phase based method, a phase is measured on the basis of a result of performing wireless communication while changing a frequency between two communication devices 1.

At this time, first, as illustrated in FIG. 2A, a measurement signal is transmitted from one communication device 1 (referred to as an initiator 100) to the other communication device 1 (referred to as a reflector 200).

Here, the initiator 100 means the communication device 1 on the side that performs a calculation process of a distance based on the measured phase out of the two communication devices 1, and the reflector 200 means the communication device 1 paired with the initiator 100 that exchanges the measurement signal with the initiator 100.

Note that FIG. 2 mainly illustrates a flow of a measurement signal related to phase measurement, and for example, the modulator 2, the DAC 3, the frequency synthesizer 7, and the ADC 17 are not illustrated.

In FIG. 2A, in the initiator 100, the measurement signal is transmitted from the antenna 9 from the calculation unit 18 via the transmission unit 4. Furthermore, in the reflector 200, the measurement signal is received by the reception unit 10 via the antenna 9.

Then, as illustrated in FIG. 2B, a measurement signal is returned from the reflector 200 to the initiator 100. That is, in the reflector 200, the measurement signal is transmitted from the antenna 9 from the calculation unit 18 via the transmission unit 4, and in the initiator 100, the measurement signal is received by the reception unit 10 via the antenna 9, and the phase characteristic between the two is measured in the calculation unit 18. By performing the reciprocating communication in this manner, it is possible to appropriately measure the phase characteristic between the communication devices 1.

Figure 3:
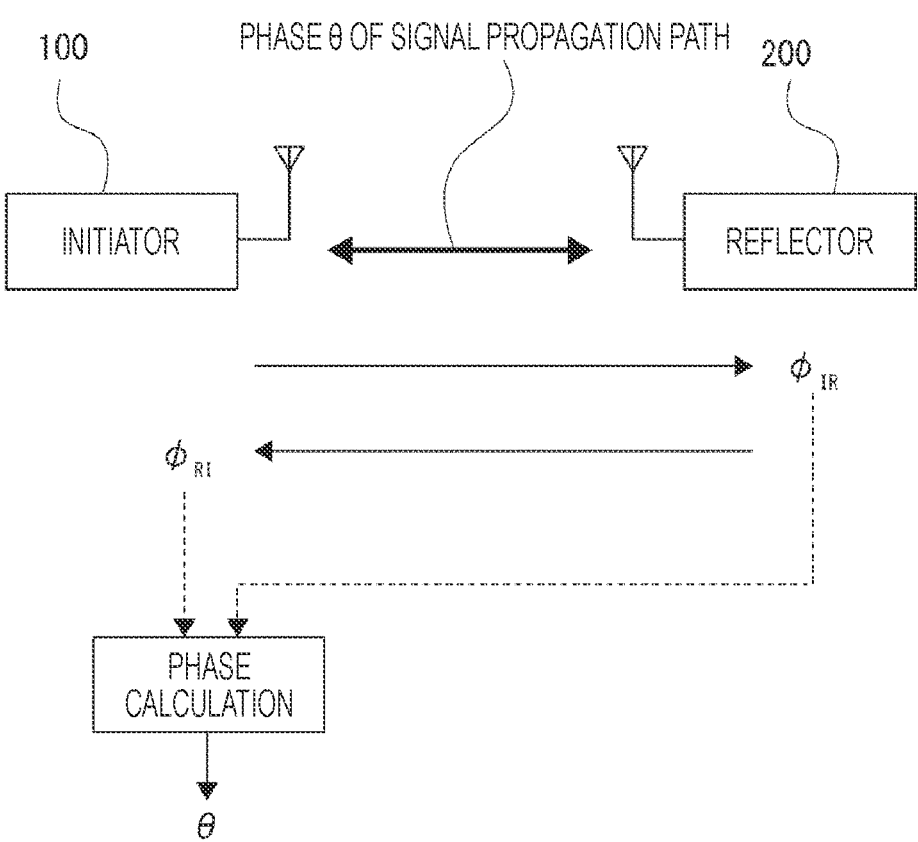
FIG. 3 is an explanatory diagram of a phase of a signal propagation path measured in the phase based method.

FIG. 3 is an explanatory diagram of a phase $\theta$ of a signal propagation path measured in the phase based method.

In a case where the measurement signal is transmitted from the initiator 100 side to the reflector 200 side as illustrated in FIG. 2A, the reflector 200 measures a signal phase $\varphi$ of the measurement signal. Here, the signal phase $\varphi$ measured when the measurement signal is transmitted from such an initiator 100 side to the reflector 200 side is referred to as "$\varphi_{IR}$".

Furthermore, in a case where the measurement signal is transmitted from the reflector 200 side to the initiator 100 side as illustrated in FIG. 2B, the initiator 100 measures the signal phase $\varphi$ of the measurement signal. The signal phase $\varphi$ measured when the measurement signal is transmitted from the reflector 200 side to the initiator 100 side in this manner is referred to as "$\varphi_{RI}$".

Here, the signal phase $\varphi$ is obtained by the following [Expression 1] when the signals of the I channel and the Q channel obtained by receiving the measurement signal are set as "I" and "O", respectively.

$$\varphi = \tan^{-1} \times Q/I \qquad \text{[Expression 1]}$$

Then, in the phase based method, the phase e of the signal propagation path is obtained on the basis of the signal phase $\varphi_{IR}$ and the signal phase $\varphi_{RI}$ described above. Specifically, the phase $\theta$ is obtained by averaging the signal phase $\varphi_{IR}$ and the signal phase $\varphi_{RI}$. As the averaging calculation here, in addition to the calculation of obtaining the average value of the signal phase $\varphi_{IR}$ and the signal phase $\varphi_{RI}$, calculation as addition of the signal phase $\varphi_{IR}$ and the signal phase $\varphi_{RI}$ can also be performed.

In the phase based method, the measurement of the phase $\theta$ as described above is performed for each frequency while the frequency of the measurement signal is sequentially changed within a predetermined frequency band. In other words, the phase $\theta$ is measured for each of the plurality of frequencies. Note that, as the "predetermined frequency band" here, for example, in the case of BLE, it is conceivable to use a frequency band determined as a use band on a communication standard, such as a 2.4 GHz band (band from 2400 MHz to 2480 MHz).

When the phase e is measured for each frequency within a predetermined frequency band as described above, the measurement result illustrated in FIG. 4A is obtained. A black circle in the drawing indicates a measurement result of the phase $\theta$ at each frequency.

The result illustrated in FIG. 4A can be rephrased as a phase characteristic with respect to the frequency of the signal propagation path.

In the phase based method, distance measurement is performed on the basis of a change mode of the phase $\theta$ when the frequency changes. Specifically, in the characteristic of the phase e with respect to a change in frequency, the magnitude of an inclination of the phase θ as illustrated in FIG. 4B correlates with the magnitude of a distance. At this time, the steeper the inclination of the phase e, the larger the distance. Therefore, the distance can be calculated on the basis of the inclination of the phase θ.

As a specific distance calculation method, a method of obtaining a group delay τ from the inclination of the phase θ and multiplying the group delay τ by the light speed (=299792458 m/s) can be exemplified. The group delay τ is used to eliminate the influence of the 2π indefiniteness of the phase. Note that the group delay τ is obtained by differentiating the phase e with the angular frequency ω.

Here, the method of calculating the distance based on the characteristic of the phase θ with respect to the frequency, that is, the phase characteristic with respect to the frequency of the signal propagation path is not limited to the above method, and various methods can be considered. For example, it is conceivable to employ a method of acquiring not only the characteristic of the phase θ with respect to the frequency but also the characteristic of the amplitude with respect to the frequency, in other words, acquiring not only the frequency characteristic of the phase θ but also the frequency characteristic of the amplitude, converting the frequency characteristic of the phase θ and the amplitude into a time response waveform by inverse Fourier transform such as inverse fast Fourier transform (IFFT), and obtaining the distance on the basis of the time response waveform.

Since the phase θ changes according to the frequency, in principle, the distance measurement by the phase based method can be performed by measuring the phase θ for at least two or more frequencies.

As described in FIG. 3, the phase based method is a method of calculating the distance by obtaining the phase 9 from measurement results of the signal phases φ in both directions from the initiator 100 to the reflector 200 and from the reflector 200 to the initiator 100, and this method, in other words, can be said to be a method of obtaining the distance on the basis of relative difference information of the signal phases φ. Accordingly, the phase based method has an advantage that it is possible to prevent the distance measurement accuracy from deteriorating due to the absolute value of a circuit delay of each block related to signal transmission and reception and a variation value due to the temperature characteristic.

However, since the phase based method is a method of performing distance measurement on the basis of a change in the phase e when the frequency changes, if the positional relationship between the communication devices 1 changes during the distance measurement (that is, during the change in the frequency), it becomes difficult to distinguish between the change in the phase θ due to a frequency change and the change in the phase θ due to the position change (distance change), and there is a problem that an error occurs in the distance measurement result.

Figure 5:
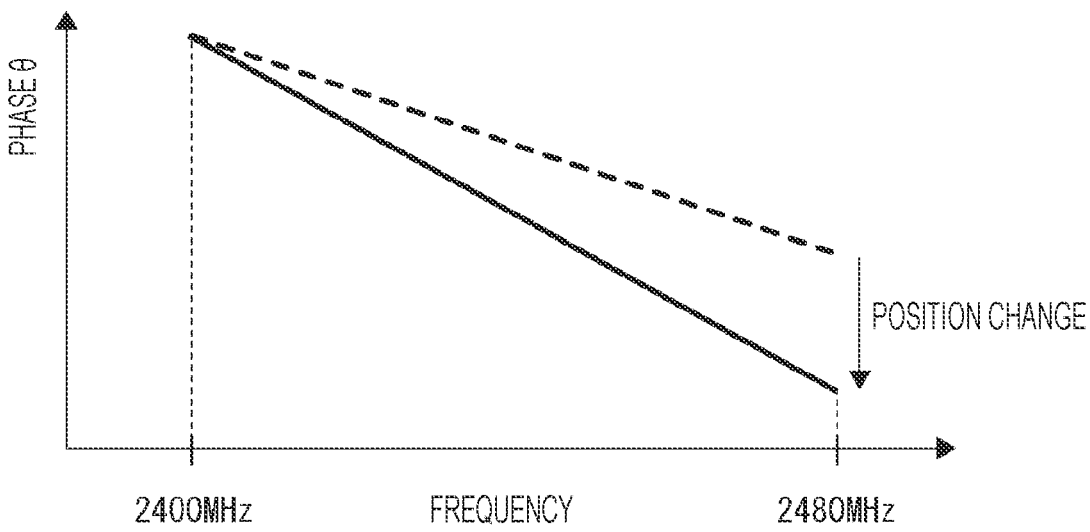
FIG. 5 is a diagram illustrating phase characteristics with respect to a frequency in a case where the communication device is displaced.

FIG. 5 is a diagram illustrating a change characteristic of the phase θ with respect to the frequency in a case where the communication device 1 is displaced. Here, an example is illustrated in which the frequency change range for distance measurement is set to the 2.4 GHz band (2400 MHz to 2480 MHz).

In the diagram, a dotted line indicates characteristics in a case where the communication device 1 is not displaced (there is no change in the distance between the communication devices 1).

In a case where the communication device 1 is displaced, as indicated by the characteristics of the solid line in the diagram, the inclination of the phase θ is different from the original inclination (dotted line).

For example, in a case where the communication device 1 (the communication device 1 as the initiator 100) is displaced away from the other communication device 1 (the communication device 1 as the reflector 200), as illustrated in the diagram, the inclination of the phase θ becomes steeper (larger) than the original inclination.

Although not illustrated, in a case where the communication device 1 is displaced so as to approach another communication device 1, the inclination of the phase θ becomes gentler (smaller) than the original inclination.

A distance measurement error caused by displacement of the communication device 1 will be exemplified by specific numerical values.

For example, the moving speed of the communication device 1 is set to 10 km/h, and the total time needed to measure the phase θ for each frequency by a frequency sweep (for example, it is assumed that the range of 2400 MHz to 2480 MHz is changed in 1 MHz steps) is set to 10 msec. Since 10 km/h is about 0.28 cm/msec, the distance changes by about 2.8 cm at 10 msec. For example, since the wavelength is about 12.5 cm at 2.480 GHz, phase rotation due to movement of 2.8/12.5*360=80.64 degrees occurs, which directly results in a distance measurement error.

Figure 6:
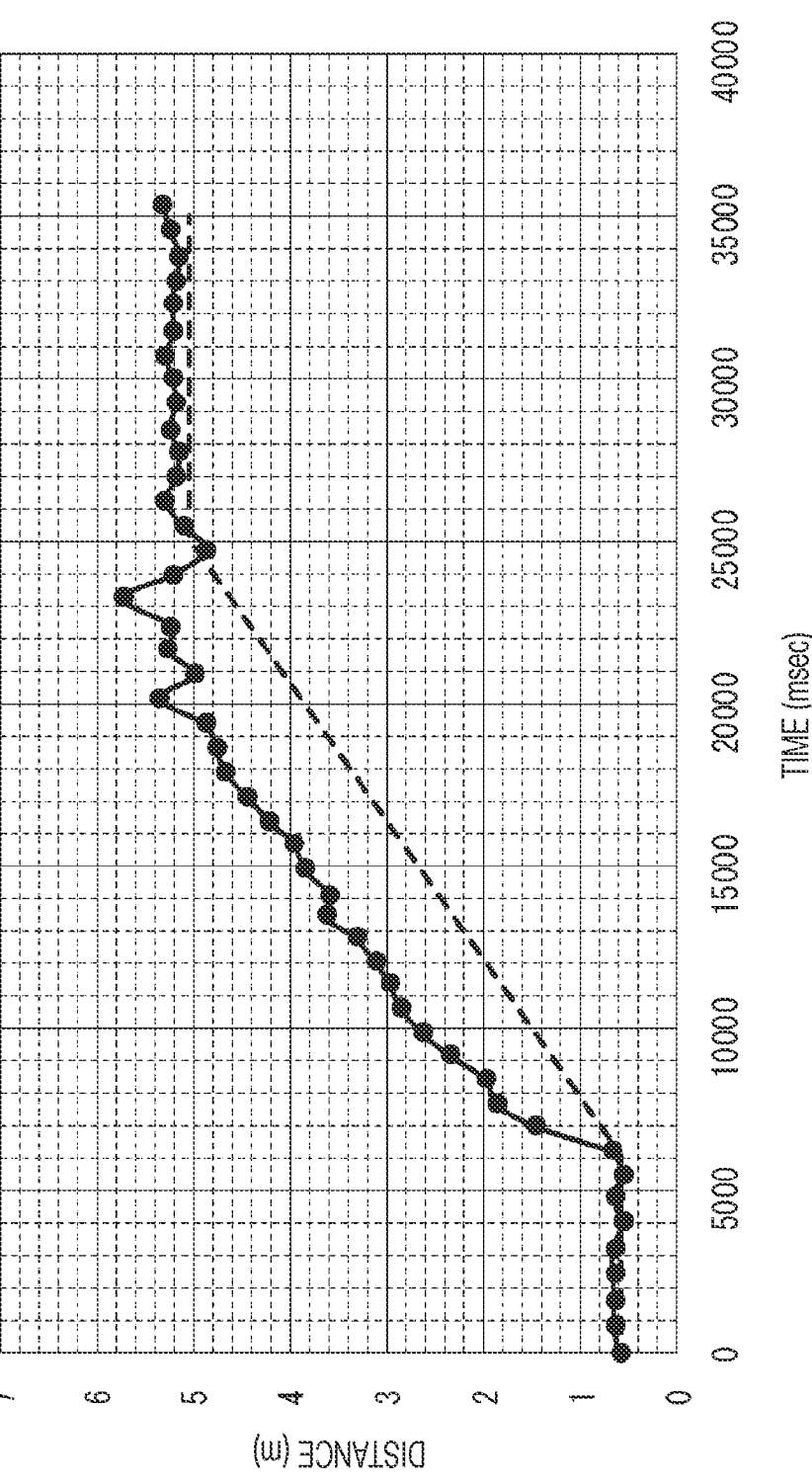
FIG. 6 is a diagram illustrating an actual evaluation result when the communication device moves regarding distance measurement by the phase based method.

FIG. 6 illustrates an example of an actual evaluation result of distance measurement by the phase based method when the communication device 1 moves.

In FIG. 6, a horizontal axis represents time (msec), and a vertical axis represents distance (m), and FIG. 6 illustrates an evaluation result when the communication device 1 stops at a point of 0.5 m from another communication device 1 for about 6 seconds, then moves at about 1 km/h, and stops at a point of 5 m. A solid line represents a distance measurement result, and a dotted line represents a correct value of the distance.

According to this evaluation result, the distance measurement error is about 20 cm in a stationary region, but the distance measurement error is enlarged according to the start of movement, and an error of about 1 m occurs. The magnitude of the distance measurement error changes depending on the relationship between the time of the frequency sweep and the moving speed of the communication device 1 (the change speed of the distance between communication devices 1). At this time, the distance measurement error tends to increase as the moving speed increases.

1-3. Distance Measurement Technique as First Embodiment

In the present embodiment, in view of the problems of the phase based method as described above, the following distance measurement technique is proposed. That is, in the distance measurement, in acquiring the phase characteristic (the characteristic of the phase 3) with respect to the frequency of the signal propagation path, the frequency is changed by a frequency change pattern including at least an upward-side change and a downward-side change. Specifically, in the first embodiment, the frequency-related phase characteristic acquisition unit F1 performs an ascending order characteristic acquisition process of acquiring a phase characteristic by changing the frequency by an ascending order change pattern of changing the frequency in ascending order within a predetermined frequency band, and a descending order characteristic acquisition process of acquiring a phase characteristic by changing the frequency by a descending order change pattern of changing the frequency in descending order within a predetermined frequency band.

More specifically, the frequency-related phase characteristic acquisition unit F1 in the present example changes the frequency by one pattern and then changes the frequency by the other pattern with respect to the ascending order change pattern and the descending order change pattern, and acquires the phase characteristic for each pattern.

The distance calculation unit F2 calculates the distance on the basis of the phase characteristic acquired in the ascending order characteristic acquisition process and the phase characteristic acquired in the descending order characteristic acquisition process.

Here, in the present specification, the "frequency change pattern" means a pattern of frequency change performed to obtain distance measurement information. In a case where the frequency change according to the ascending order change pattern and the frequency change according to the descending order change pattern are performed in distance measurement as described above, the ascending order change pattern and the descending order change pattern form one "frequency change pattern".

Figure 7:
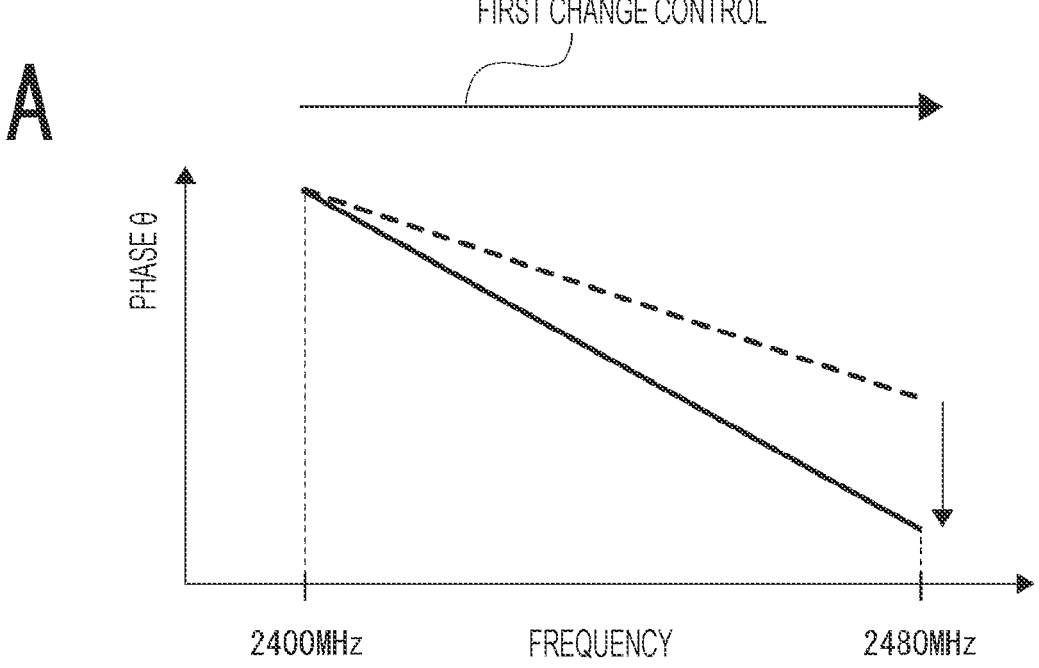
FIG. 7 is a diagram for describing phase characteristics with respect to frequencies obtained in a case where a frequency is changed in ascending order and in a case where a frequency is changed in descending order.
Figure 7:
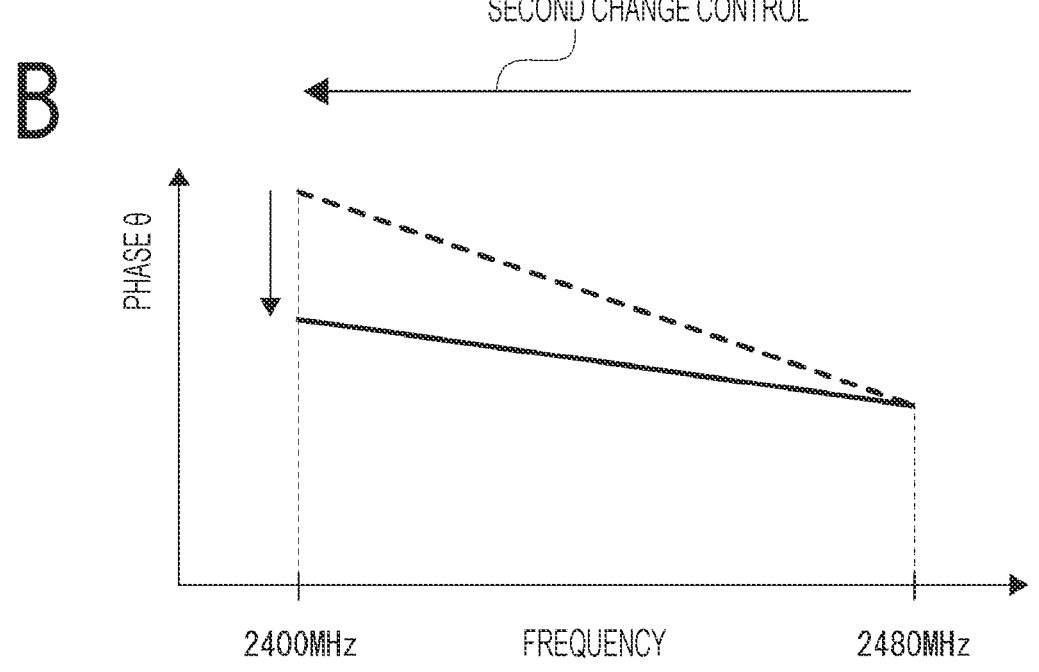

FIG. 7 is a diagram for describing the characteristics of the phase $\theta$ with respect to frequencies obtained in a case where the frequency is changed in ascending order (FIG. 7A) and in a case where the frequency is changed in descending order (FIG. 7B).

In FIGS. 7A and 7B, the dotted line represents the characteristic of the phase $\theta$ in a case where there is no distance change between the communication devices 1, and the solid line represents the characteristic of the phase $\theta$ in a case where there is a distance change between the communication devices 1 (in a case where the communication device 1 as the initiator 100 moves away from the communication device 1 as the reflector 200).

Note that, in FIG. 7, "first change control" means control on the side where it is performed earlier in terms of time with respect to control for changing a frequency within a predetermined frequency band, and "second change control" means change control of a frequency performed subsequent to "first change control".

In the drawing, with respect to the first and second change controls, whether the frequency changes in ascending order or in descending order is expressed by directions of arrows.

As illustrated in FIG. 7A, in a case where the frequency is changed in ascending order, the inclination of the phase $\theta$ becomes steeper than the original inclination (dotted line) according to the distance change between the communication devices 1. On the other hand, in a case where the frequency is changed in descending order, the inclination of the phase $\theta$ becomes gentler than the original inclination according to the distance change between the communication devices 1.

As understood from this point, by averaging the inclination of the phase e obtained for each of the ascending order change and the descending order change, it is possible to cancel the influence of an offset (see FIG. 6) caused by the distance change between the communication devices 1.

From this point, in the first embodiment, the frequency-related phase characteristic acquisition unit F1 first performs any one of the ascending order characteristic acquisition process and the descending order characteristic acquisition process described above to acquire the inclination of the phase $\theta$ with respect to any one of the ascending order change and the descending order change, and then performs the other one of the ascending order characteristic acquisition process and the descending order characteristic acquisition process to acquire the inclination of the phase $\theta$ with respect to the other one of the ascending order change and the descending order change.

Then, the distance calculation unit F2 in this case calculates an average value of these two inclinations, and calculates the distance between the communication devices 1 on the basis of the average value.

Here, in each of the phase characteristic acquisition process for the ascending order change of the frequency and the phase characteristic acquisition process for the descending order change, a process of acquiring the signal phases $\varphi_{IR}$ and $\varphi_{RI}$ is performed for each step of the frequency change. At this time, the communication device 1 as the initiator 100 performs a process of acquiring the signal phase $\varphi_{IR}$ measured by the communication device 1 as the reflector 200, and calculates the phase $\theta$ based on the acquired signal phase $\varphi_{IR}$ and the signal phase $\varphi_{RI}$ measured by the communication device 1 itself.

In acquiring the phase characteristics for each of the ascending order change and the descending order change, such processing for calculating the phase $\theta$ for each step is sequentially performed while changing the frequency.

1-4. Processing Procedure

An example of a specific processing procedure to be executed to implement the distance measurement technique as the first embodiment described above will be described with reference to a flowchart of FIG. 8.

Figure 8:
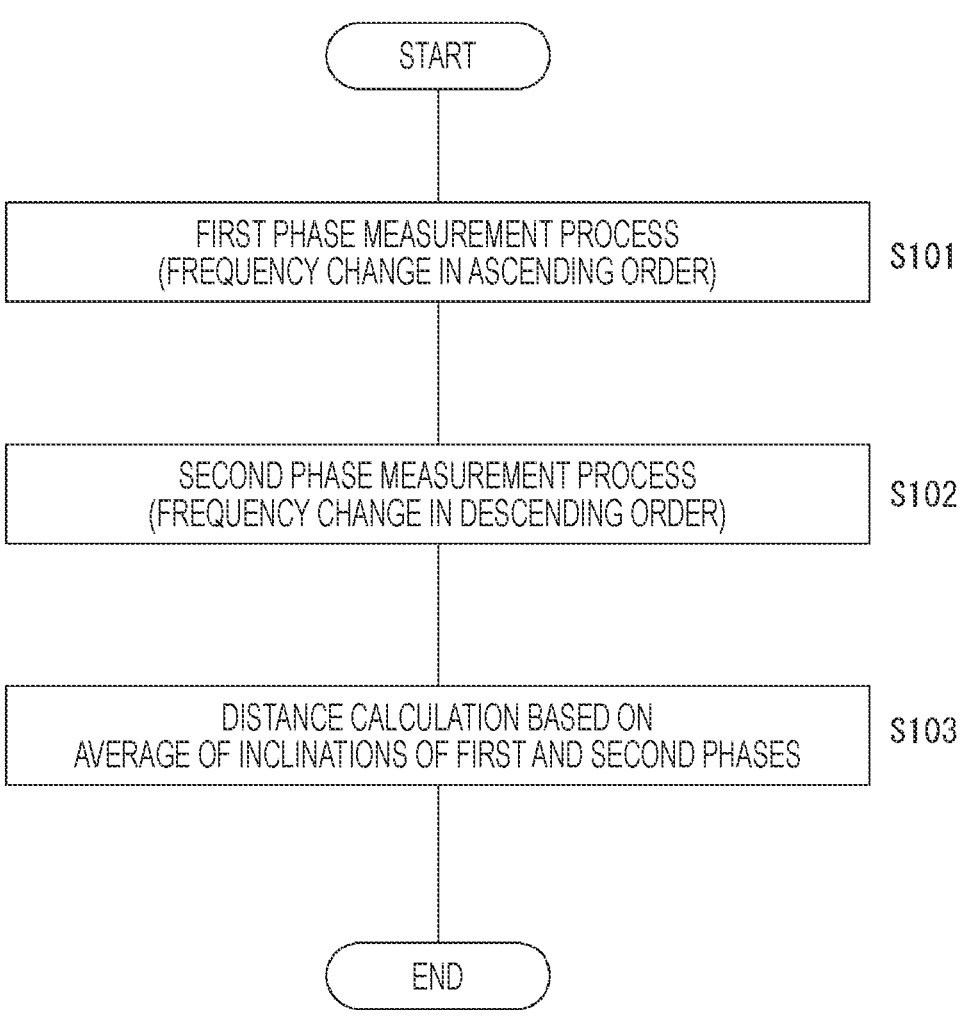
FIG. 8 is a flowchart illustrating an example of a specific processing procedure to be executed to implement a distance measurement technique as the first embodiment.

Note that, in the present example, the processing illustrated in FIG. 8 is executed as software processing by the CPU of the calculation unit 18 illustrated in FIG. 1.

First, in step S101, the calculation unit 18 performs either the ascending order characteristic acquisition process or the descending order characteristic acquisition process described above as the first phase measurement process. Here, it is an example of performing the ascending order characteristic acquisition process first. Therefore, in step S101, the calculation unit 18 changes the frequency of the measurement signal in ascending order, performs the above-described calculation process of the phase $\theta$ for each step of the frequency (including the acquisition process of the signal phase (pi from the reflector 200) for each frequency, and performs a process of calculating the characteristic of the phase e with respect to the ascending order change of the frequency, specifically, the inclination of the phase $\theta$.

Figure 4:
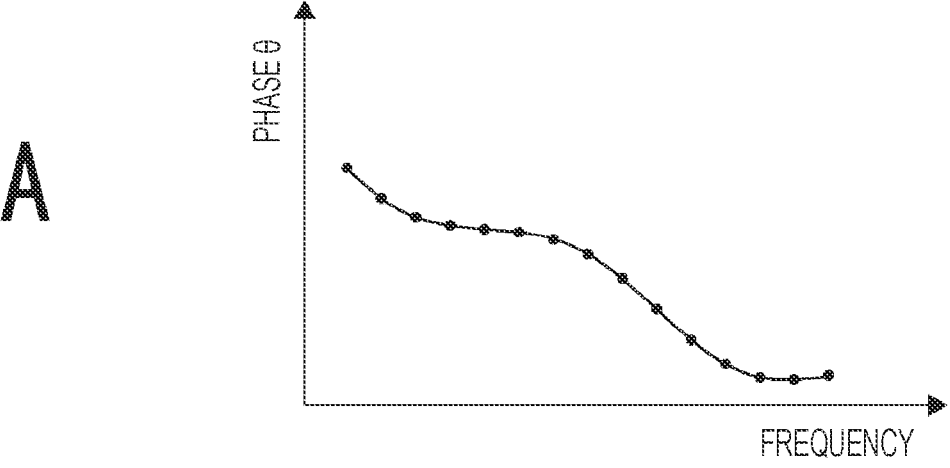
FIG. 4 is an explanatory diagram of a phase characteristic with respect to a frequency of the signal propagation path.
Figure 4:
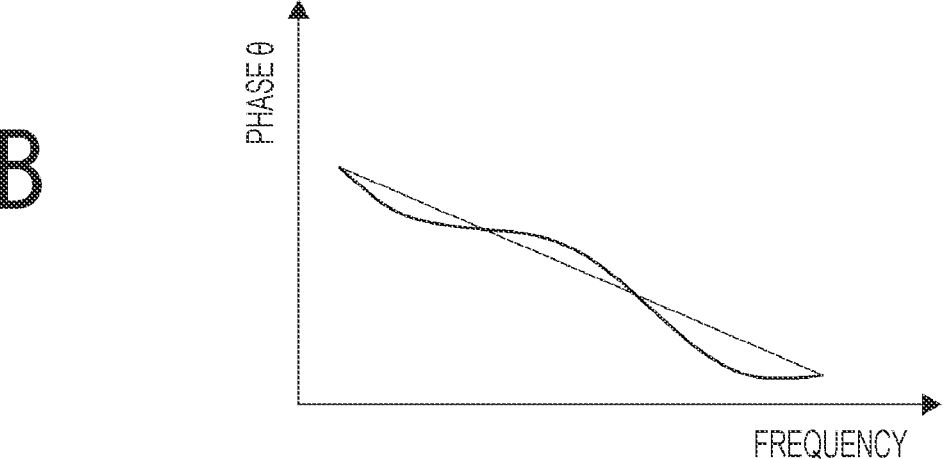

Here, as can be seen with reference to FIG. 4 above, in practice, the characteristics of the phase $\theta$ with respect to the change in frequency are not linear characteristics but characteristics having a variation to some extent. Accordingly, in obtaining the inclination of the phase $\theta$, for example, linear interpolation processing such as a least squares method is performed on the actually obtained phase $\theta$ for each frequency.

In step S102 subsequent to step S101, the calculation unit 18 performs the other of the ascending order characteristic acquisition process and the descending order characteristic acquisition process as a second phase measurement process. That is, in the present example, the descending order characteristic acquisition process is performed. Note that the content of the descending order characteristic acquisition process here, that is, the process for obtaining the inclination of the phase e with respect to the descending order change in frequency is similar to the processing content described in step S101 described above except that the frequency of the measurement signal is changed in descending order, and thus redundant description is avoided.

In step S103 following step S102, the calculation unit 18 performs distance calculation based on an inclination average of first and second phases. That is, an average value of the inclination of the phase θ with respect to the ascending order change obtained in step S101 and the inclination of the phase θ with respect to the descending order change obtained in step S102 is calculated, and the distance between the communication devices 1 is calculated on the basis of the average value.

Note that, as a specific method for calculating the distance on the basis of the inclination of the phase 9, a method of multiplying the group delay t obtained from the inclination of the phase θ by the value of the light speed, or the like can be exemplified as described above.

In response to the execution of the process of step S103, the calculation unit 18 terminates the series of processes illustrated in FIG. 8.

1-5. Distance Measurement Technique as Modification of First Embodiment

Figure 9:
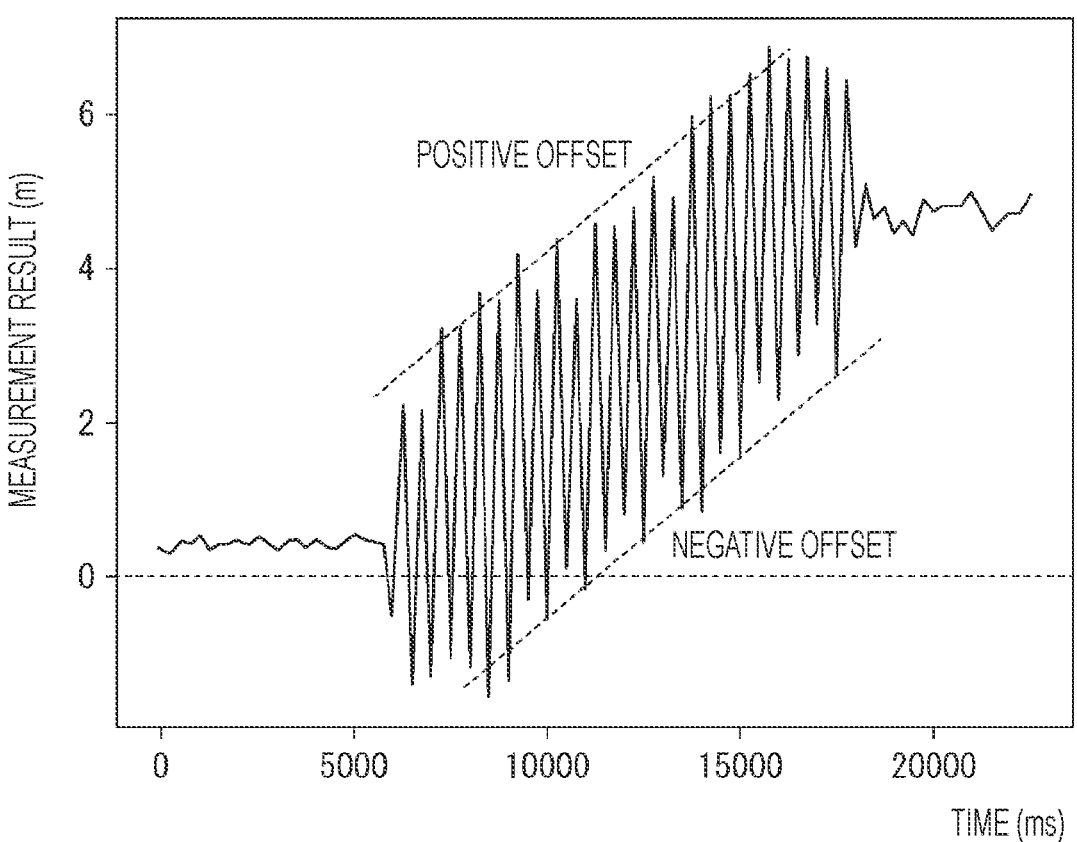
FIG. 9 is an explanatory diagram of an offset of a distance occurring in a case where there is a distance change between communication devices.

FIG. 9 is an explanatory diagram of an offset of a distance that occurs in a case where there is a distance change between the communication devices 1.

Specifically, in FIG. 9, similarly to FIG. 6 described above, the horizontal axis represents time (msec), the vertical axis represents distance (m), the ascending order characteristic acquisition process and the descending order characteristic acquisition process are alternately performed, and a result of individually calculating the distance from the inclinations of the phase θ obtained in each acquisition process, that is, a result of individually calculating the distance from each inclination without averaging the inclinations of the phase θ obtained in each acquisition process is illustrated. Also in this case, the change in the distance between the communication devices 1 is a change in a direction in which the communication device 1 as the initiator 100 moves away from the communication device 1 as the reflector 200 as in the case of FIG. 6.

From FIG. 9, it can be seen that, in a case where the ascending order characteristic acquisition process and the descending order characteristic acquisition process are alternately performed, and the distance is individually calculated from the inclination of the phase 9 obtained in each acquisition process, a positive offset and a negative offset alternately occur in the calculated distance.

Figure 10:
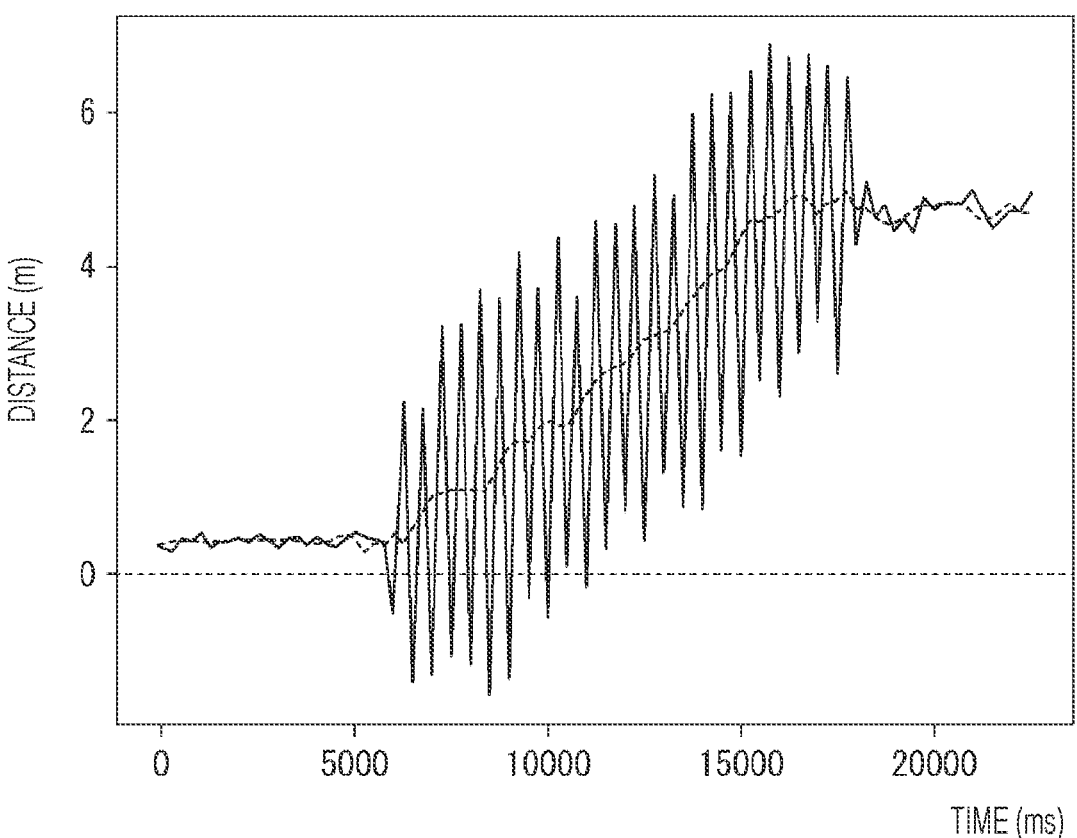
FIG. 10 is a diagram illustrating a moving average with respect to a distance calculation result illustrated in FIG. 9.

FIG. 10 illustrates a moving average (dotted line in the drawing) with respect to the distance calculation result illustrated in FIG. 9.

From the comparison between FIG. 10 and FIG. 9, it can be seen that in a case where the distance is calculated only by one of the change in ascending order and the change in descending order, an offset of only one of positive and negative occurs with respect to the distance change between the communication devices 1, but the correct distance can be calculated by taking the average of the distances calculated for each of the change in ascending order and the change in descending order.

Therefore, as a modification of the first embodiment, a method of calculating the distance for the ascending order change and the distance for the descending order change and averaging the distances is proposed. Specifically, the method is a method of averaging the distance calculated on the basis of the characteristic of the phase θ obtained with respect to the ascending order change of the frequency and the distance calculated on the basis of a phase characteristic obtained with respect to the descending order change of the frequency.

Figure 11:
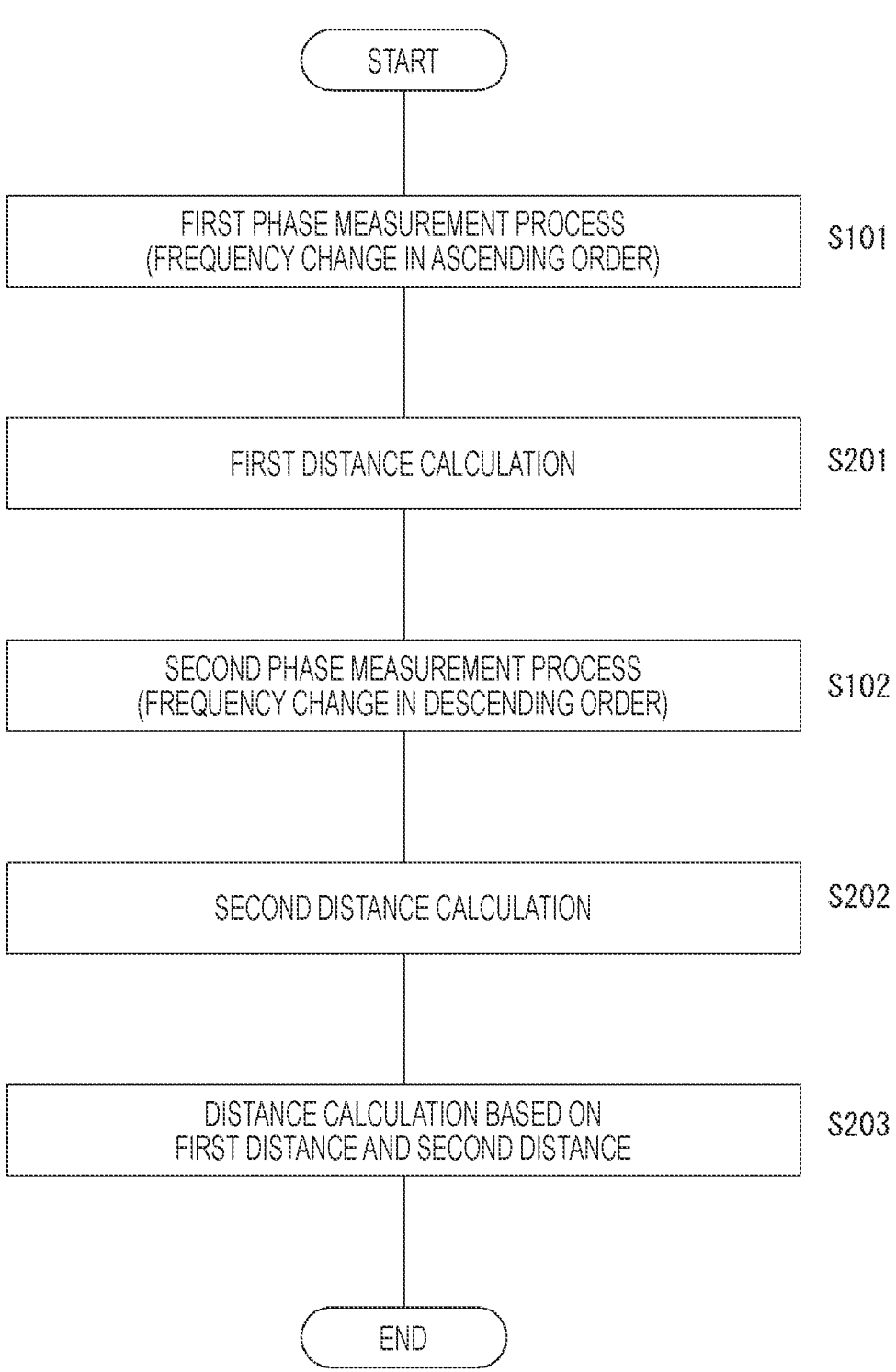
FIG. 11 is a flowchart illustrating an example of a specific processing procedure for implementing a distance measurement technique as a modification of the first embodiment.

FIG. 11 is a flowchart illustrating an example of a specific processing procedure for implementing such a distance measurement technique as a modification of the first embodiment.

Note that in the following description, the same reference numerals and the same step numbers will be used for parts similar to those already described, and the description thereof will be omitted.

In FIG. 11, also in this case, the calculation unit 18 first performs the first phase measurement process in step S101. Then, in response to the execution of the first phase measurement process in step S101, the calculation unit 18 in this case executes the first distance calculation process in step S201. Specifically, a process of calculating the distance on the basis of the inclination of the phase e with respect to the ascending order change obtained in the process of step S101 is performed.

In response to the execution of the first distance calculation process in step S201, the calculation unit 18 in this case performs the second phase measurement process in step S102 and then performs the second distance calculation process in step S202. That is, a process of calculating the distance on the basis of the inclination of the phase θ with respect to the descending order change obtained in the process of step S102 is performed.

In response to the execution of the second distance calculation process in step S202, the calculation unit 18 performs a distance calculation process based on the first distance and the second distance in step S203.

Specifically, a process of averaging the distance calculated in step S201 and the distance calculated in step S202 is performed.

In response to the execution of the process of step S203, the calculation unit 18 terminates the series of processes illustrated in FIG. 11.

Note that, in the modification described above, the distance calculation method in steps S201 and S202 is not limited to the calculation method based on the inclination of the phase θ. For example, it is conceivable to employ a method of obtaining the distance on the basis of the time response waveform obtained by performing the inverse Fourier transform on the frequency characteristics of the phase θ and the amplitude as exemplified above.

2. Second Embodiment

Next, a second embodiment will be described. In the second embodiment, the distance is calculated by randomly changing the frequency.

Figure 12:
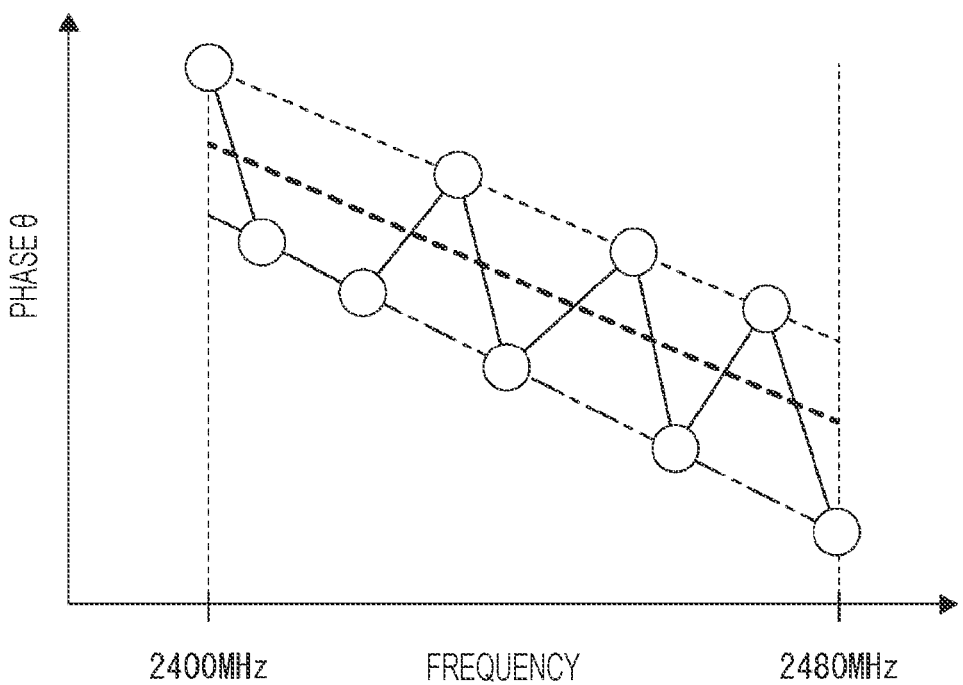
FIG. 12 is a schematic explanatory diagram of a method of randomly changing a frequency.

FIG. 12 is a schematic explanatory diagram of a method of randomly changing the frequency, and specifically illustrates the characteristic of the phase θ with respect to the frequency obtained in a case where the frequency of the measurement signal is randomly changed within a predetermined frequency band in a case where the distance between the communication devices 1 changes.

In FIG. 12, a white circle represents the value (sample value) of the phase θ obtained with respect to each frequency randomly changed. Furthermore, in FIG. 12, a dotted line indicates the inclination of the phase θ obtained in a case where the communication device 1 is stationary at a point A, and an alternate long and short dash line indicates the inclination of the phase θ obtained in a case where the communication device 1 is stationary at a point B. Here, for the sake of explanation, it is assumed that the value of the phase e obtained with respect to each frequency is classified into one of these points A and B.

When the frequency is randomly changed, the samples of the phase θ are dispersed at the point (distance) A and the point (distance) B as illustrated in the drawing. From this, when the inclination of the phase e is obtained (for example, linear interpolation by a least squares method or the like is performed on the sample) on the basis of the samples for each frequency of the phase θ obtained in a case where the frequency is randomly changed, it can be converged to the inclination indicated by the thick dotted line in the drawing. The inclination indicated by the thick dotted line corresponds to the distance between the point A and the point B, and by converging to the inclination indicated by the thick dotted line, the offset with respect to a displacement of the communication device 1 from the point A to the point B is canceled. That is, it is possible to reduce a distance measurement error with respect to a distance change between the communication devices 1.

Here, for confirmation, it can be said that the frequency change pattern for randomly changing the frequency as described above belongs to one mode of the frequency change pattern including the upward-side change and the downward-side change of the frequency.

Figure 13:
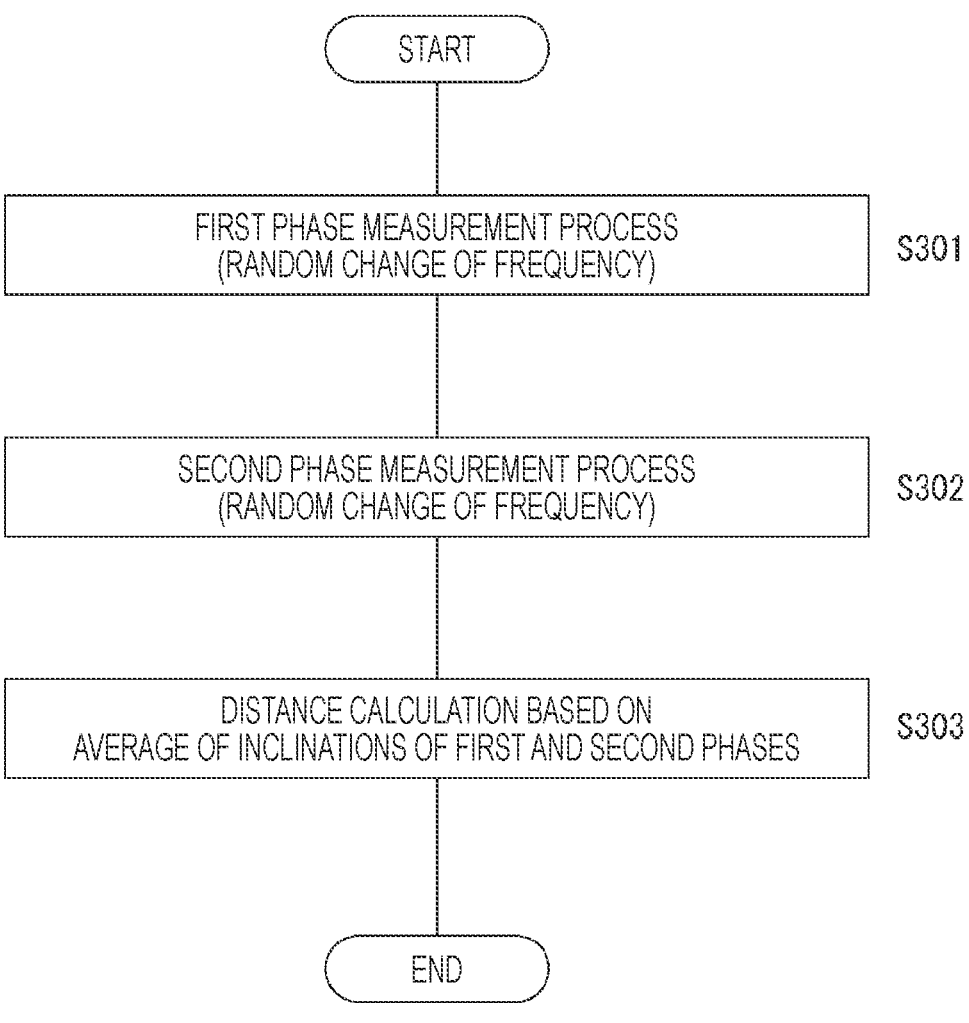
FIG. 13 is a flowchart illustrating an example of a specific processing procedure for implementing a distance measurement technique corresponding to a case where the frequency is randomly changed.

FIG. 13 is a flowchart illustrating an example of a specific processing procedure for implementing a distance measurement technique corresponding to a case where the frequency is randomly changed. Here, an example of calculating the distance by performing the random change of the frequency twice will be described.

In this case, as each of the first phase measurement process in step S301 and the second phase measurement process in step S302 subsequent to step S301, the calculation unit 18 performs processing of acquiring samples of the phase θ for each frequency by randomly changing the frequency within a predetermined frequency band, and calculating the inclination of the phase θ on the basis of the acquired samples of the phase θ.

Note that, also in a case where the frequency is randomly changed to obtain the sample of the phase θ for each frequency, similarly to the case of obtaining the samples of the phase θ with respect to the ascending order change or the descending order change described above, a process of acquiring the signal phase $\varphi_{IR}$ measured by the communication device 1 as the reflector 200 and a process of calculating the phase θ on the basis of the acquired signal phase $\varphi_{IR}$ and the signal phase $\varphi_{RI}$ measured by itself are performed for each step of the frequency change.

In response to execution of the first phase measurement process in step S301 and the second phase measurement process in step S302, the calculation unit 18 in this case performs distance calculation based on the inclination average of the first and second phases in step S303. That is, processing of calculating the distance on the basis of the average value of the inclinations of the phase θ calculated in each of the first phase measurement process in step S301 and the second phase measurement process in step S302 is performed.

Note that, in the method of calculating the distance by randomly changing the frequency, the number of random changes of the frequency is only required to be at least one, but by employing a method of performing random changes of the frequency a plurality of times as described above and calculating the distance on the basis of the average value of the inclinations of the phase θ obtained with respect to each random change, it is possible to improve the distance measurement accuracy.

Furthermore, even in a case where the frequency is randomly changed, the method described as the modification of the first embodiment can be applied. That is, it is a method in which the random characteristic acquisition process of randomly changing the frequency to acquire the characteristic of the phase θ with respect to the frequency is performed a plurality of times, and the distances calculated from the characteristics of the phase θ acquired in each random characteristic acquisition process are averaged.

3. Third Embodiment

In a third embodiment, a frequency change pattern is changed on the basis of information of a moving speed of a communication device.

Figure 14:
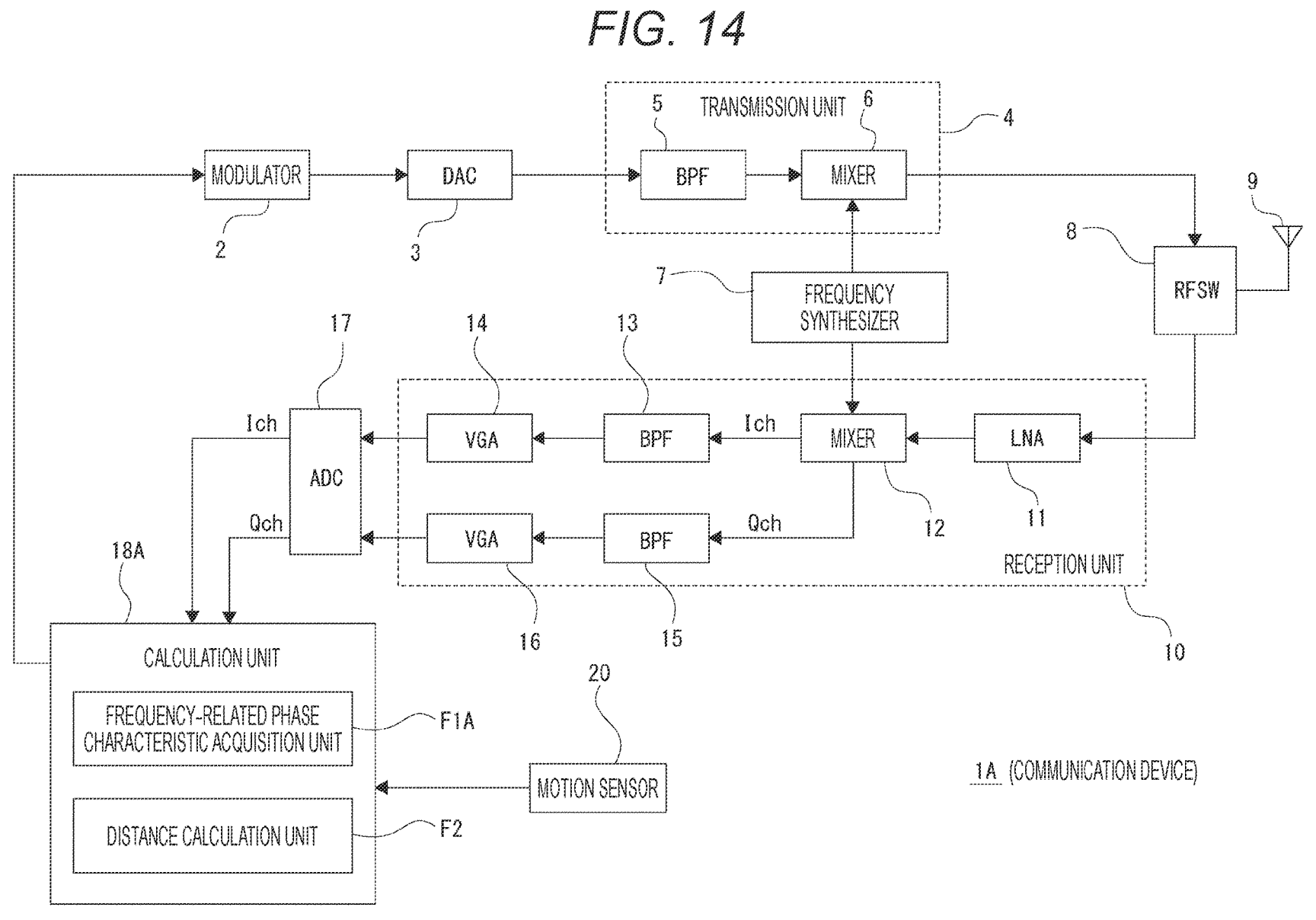

FIG. 14 is a block diagram illustrating a configuration example of a communication device 1A as a third embodiment.

A difference from the communication device 1 illustrated in FIG. 1 is that a motion sensor 20 is provided and a calculation unit 18A is provided instead of the calculation unit 18.

The motion sensor 20 represents a sensor for detecting the motion of the communication device 1A. Examples of the sensor in this case include an acceleration sensor. For example, the moving speed of the communication device 1A can be obtained by time-integrating the output signal of the acceleration sensor.

Alternatively, as the motion sensor 20, for example, a composite sensor including an acceleration sensor represented by an inertial measurement unit (IMU) can be used. For example, it is conceivable to use a composite sensor of an acceleration sensor and an angular velocity sensor.

The calculation unit 18A is different from the calculation unit 18 in that a frequency-related phase characteristic acquisition unit F1A is included instead of the frequency-related phase characteristic acquisition unit F1.

The frequency-related phase characteristic acquisition unit F1A changes the frequency change pattern on the basis of the information on the moving speed of the communication device 1A obtained on the basis of the output of the motion sensor.

Specifically, the frequency-related phase characteristic acquisition unit F1A changes the frequency by the frequency change pattern including the upward-side change and the downward-side change in a case where the moving speed is equal to or more than a predetermined speed, and changes the frequency by the frequency change pattern including only the upward-side change or only the downward-side change in a case where the moving speed is not equal to or more than the predetermined speed.

More specifically, in a case where the moving speed is equal to or more than a predetermined speed, the frequency-related phase characteristic acquisition unit F1A in the present example changes the frequency in one of the ascending order change and the descending order change, and then changes the frequency in the other of the ascending order change and the descending order change, similarly to the first embodiment. That is, one of the ascending order characteristic acquisition process and the descending order characteristic acquisition process is performed, and then the other is performed.

On the other hand, in a case where the moving speed is not equal to or more than the predetermined speed, only one of the ascending order characteristic acquisition process and the descending order characteristic acquisition process is performed.

By employing the method of changing the frequency change pattern according to the moving speed of the communication device 1A as described above, it is possible to perform distance measurement of changing the frequency by the frequency change pattern including the upward-side change and the downward-side change only in a case where a distance change between the communication devices is recognized.

Therefore, distance measurement can be performed by an appropriate method according to the presence or absence of a distance change. In particular, in a case where the frequency change is performed by the ascending order change pattern and the descending order change pattern as the frequency change pattern including the upward-side change and the downward-side change, the frequency change of only one of the ascending order and the descending order needs to be performed as the frequency change in a case where the distance change is not recognized, and thus it is possible to reduce the processing load related to the distance measurement and to shorten the processing time necessary for the distance measurement.

Figure 15:
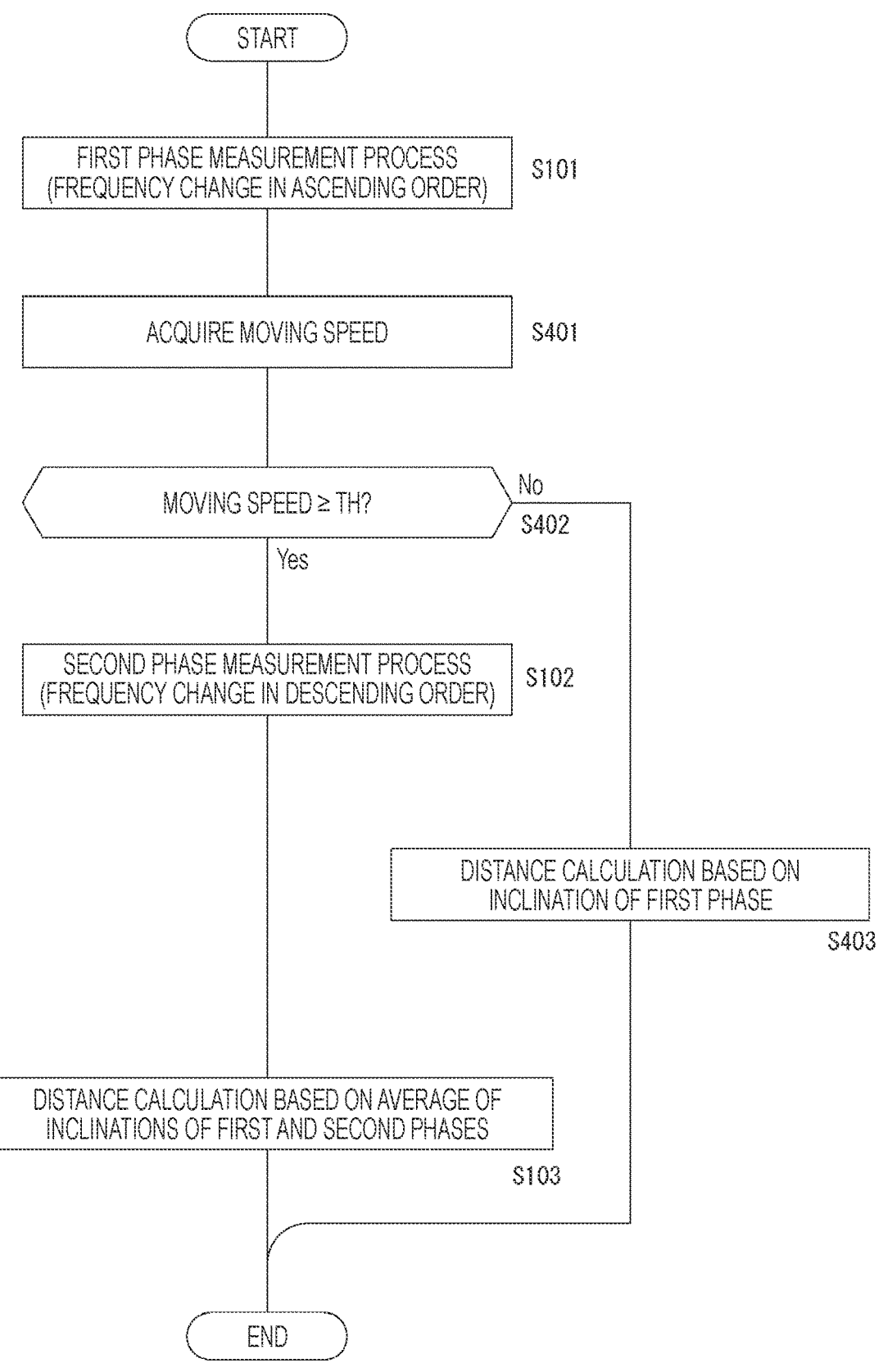
FIG. 15 is a flowchart illustrating an example of a specific processing procedure for implementing a distance measurement technique as the third embodiment.

The flowchart of FIG. 15 illustrates an example of a specific processing procedure for implementing the distance measurement technique as the third embodiment described above.

In the present example, the processing illustrated in FIG. 15 is executed as software processing by the CPU of the calculation unit 18A.

In this case, the calculation unit 18A performs the first phase measurement process (in this example, the ascending order characteristic acquisition process with frequency ascending order change) in step S101, and then performs a moving speed acquisition process in step S401. That is, a process of acquiring the moving speed of the communication device 1A is performed by performing predetermined calculation based on the output signal of the motion sensor 20 or the like.

In response to the execution of the moving speed acquisition process in step S401, the calculation unit 18A determines whether or not the moving speed is equal to or higher than a predetermined threshold TH in step S402.

When the moving speed is not equal to or higher than the threshold TH, the calculation unit 18A proceeds to step S403 to perform the distance calculation process based on the inclination of the first phase, that is, the distance calculation process based on the inclination of the phase e obtained in the acquisition process of step S101, and terminates the series of processing illustrated in FIG. 15. Thus, in a case where the movement of the communication device 1A is not recognized during the distance measurement, it is possible to perform only one frequency change of the ascending order or the descending order as the frequency change.

On the other hand, in a case where it is determined in step S402 that the moving speed is equal to or more than the threshold TH, the calculation unit 18A performs the second phase measurement process (in this example, the descending order characteristic acquisition process with a frequency descending order change) in step S102, then performs the distance calculation process in step S103, and terminates the series of processing illustrated in FIG. 15.

Thus, in a case where the movement of the communication device 1A is recognized during the distance measurement, the distance is calculated on the basis of the characteristics of the phase θ with respect to the frequency changes in both the ascending order and the descending order, and the distance measurement accuracy can be improved.

Note that, as described as a modification of the first embodiment, also in a case of employing the method of averaging the distance obtained from the phase characteristic for the ascending order change and the distance obtained from the phase characteristic for the descending order change, the frequency change pattern can be changed according to the moving speed in a similar manner. Specifically, when the moving speed is not equal to or more than the threshold TH, the distance is obtained from the phase characteristic for only the ascending order change pattern, and in a case where the moving speed is equal to or more than the threshold TH, the distance obtained from the phase characteristic for the ascending order change and the distance obtained from the phase characteristic for the descending order change are averaged.

Furthermore, the third embodiment is also applicable to a case where the frequency is randomly changed as in the second embodiment. Specifically, in this case, it is conceivable to obtain the distance from the phase characteristic only for the ascending or descending order change pattern if the moving speed is not equal to or more than the threshold TH, and to perform the distance calculation based on the characteristic of the phase e obtained by randomly changing the frequency in a case where the moving speed is equal to or greater than the threshold TH.

4. Modification

Here, the embodiments are not limited to the specific example described above, and configurations as various modifications can be employed.

For example, the frequency change pattern for distance measurement is not limited to the patterns exemplified above.

As an example, it is conceivable to change the frequency in a pattern as illustrated in FIG. 16A.

Specifically, when an output period of a single frequency in the process of frequency change is set to "one frame", the frequency is changed by the ascending order change pattern using one frame of an odd number or an even number, and the frequency is changed by the descending order change pattern using the other of the odd or even frames.

FIG. 16A illustrates an example in which even-numbered frames are allocated to the ascending order change and odd-numbered frames are allocated to the descending order change for the 2.4 GHz band, and in this example, the start frequency of the ascending order change is 2400 MHz, the start frequency of the descending order change is 2480 MHz, and the frequency change amount for each step of the frequency change is 10 MHz in both the ascending order change and the descending order change.

Note that the frequency change amount for each step of the ascending order change and the descending order change is set to 10 MHz for the convenience of illustration, and of course, the frequency change amount can be set to other than 10 MHz, such as 1 MHz, 2 MHz, or 5 MHz. Furthermore, regarding the ascending order change and the descending order change of the frequency including the ascending order change and the descending order change described in the first embodiment, the frequency change amount for each step can be constant or non-constant.

Even in a case of the frequency change pattern as illustrated in FIG. 16A, the calculation of the distance is only required to be performed on the basis of the characteristic of the phase θ obtained with respect to the ascending order change of the frequency and the characteristic of the phase θ obtained with respect to the descending order change of the frequency. For example, the inclination of the phase θ obtained with respect to the ascending order change of the frequency and the inclination of the phase e obtained with respect to the descending order change of the frequency are obtained, and the distance is calculated on the basis of the average value of the inclinations.

By employing the frequency change pattern as illustrated in FIG. 16A, the frequency change is performed so that the frequency in the ascending order change pattern and the frequency in the descending order change pattern are alternately switched, and the time difference between the ascending order change pattern side and the descending order change pattern side is reduced. That is, under a change in the distance to another communication device, the difference in the distance between the time of setting the frequency in the ascending order change pattern and the time of setting the frequency in the descending order change pattern is suppressed.

Therefore, the distance measurement accuracy can be improved.

Furthermore, as illustrated in FIG. 16B, the frequency change pattern may be a change pattern in which advertisement channels (2402 MHz, 2426 MHz, and 2480 MHz) in BLE are excluded.

At this time, the pattern of the frequency change performed temporally earlier (preceding frequency change pattern) can be any one of the ascending order change pattern and the descending order change pattern, and the succeeding frequency change pattern can be the other of the ascending order change pattern and the descending order change pattern. Alternatively, the preceding and succeeding frequency change pattern may be a random change pattern.

In addition, as illustrated in FIG. 16C, for each of the preceding frequency change pattern and the succeeding frequency change pattern, both ends may be selected from a low frequency and a high frequency, respectively, thereby securing the inclination.

Moreover, in the example of FIG. 16C, the frequency change amount for each step can be made different between both ends and a portion therebetween, such as setting the frequency (2400 MHz to 2404 MHz, 2476 MHz to 2480 MHz) at both ends in increments of 1 MHz, and setting the frequency (from 2404 MHz to 2476 MHz) between both ends in increments of 8 MHz.

Furthermore, as illustrated in FIG. 16D, the frequencies at both ends may be partially fixed instead of being selected.

Furthermore, in a case where the frequency is randomly changed as in the second embodiment, it is not essential to configure the frequency change pattern for distance measurement only with the random change pattern, and a part of the frequency change pattern may be a change pattern (non-random pattern) other than the random change pattern.

For example, in the examples of FIGS. 16C and 16D, it is conceivable to set a portion (2404 MHz to 2476 MHz) between both ends as a random change pattern, or the like.

Here, in the above description, a case where communication based on the BLE method is performed as wireless communication for distance measurement has been exemplified, but a specific wireless communication method is not limited, and for example, wireless communication based on another method such as Wi-Fi (registered trademark) or long term evolution (LTE) can be employed.

5. Summary of Embodiment

As described above, a communication device (the same 1 or 1A) as an embodiment includes a phase characteristic acquisition unit (the frequency-related phase characteristic acquisition unit F1 or F1A) that acquires a phase characteristic with respect to a frequency of a signal propagation path with another communication device, and a distance calculation unit (the same F2) that calculates a distance to the another communication device on the basis of the phase characteristic, in which the phase characteristic acquisition unit acquires the phase characteristic by changing the frequency by a frequency change pattern including at least an upward-side change and a downward-side change.

The phase characteristic obtained by changing the frequency on the upward side and the phase characteristic obtained by changing the frequency on the downward side show a difference corresponding to a distance change with respect to other communication devices, and it is possible to appropriately obtain the distance in a case where there is a distance change by performing distance calculation based on the phase characteristic obtained by changing the frequency by the frequency change pattern including the upward change and the downward change as described above.

Therefore, it is possible to improve the distance measurement accuracy in a case where there is a distance change with respect to the another communication device.

Furthermore, in the communication device as the embodiment, the phase characteristic acquisition unit performs an ascending order characteristic acquisition process of acquiring the phase characteristic by changing the frequency by an ascending order change pattern for changing the frequency in a predetermined frequency band in ascending order and a descending order characteristic acquisition process of acquiring the phase characteristic by changing the frequency by a descending order change pattern for changing the frequency in the predetermined frequency band in descending order, and the distance calculation unit calculates the distance on the basis of the phase characteristic acquired in the ascending order characteristic acquisition process and the phase characteristic acquired in the descending order characteristic acquisition process.

When the distance to another communication device changes, in a case where the frequency is changed in ascending order, the inclination of the phase with respect to the frequency is steeper than the inclination in a case where there is no distance change, and on the other hand, in a case where the frequency is changed in descending order, the inclination is gentler than the inclination in a case where there is no distance change. Therefore, it is possible to appropriately obtain the distance in a case where there is a distance change by performing distance calculation based on both phase characteristics, such as taking an average of the inclination when changing in ascending order and the inclination when changing in descending order.

Therefore, it is possible to improve the distance measurement accuracy in a case where there is a distance change.

Moreover, in the communication device as the embodiment, the phase characteristic acquisition unit changes the frequency by one pattern and then changes the frequency by the other pattern with respect to the ascending order change pattern and the descending order change pattern (see FIGS. 8 and 15 and the like).

Thus, the frequency change amount at the time of frequency switching can be suppressed.

Therefore, the time needed for frequency switching can be shortened, and the processing time needed for distance measurement can be shortened.

Furthermore, in the communication device as the embodiment, when an output period of a single frequency in a process of frequency change is set to one frame, the phase characteristic acquisition unit changes the frequency by the ascending order change pattern using one frame of an odd number or an even number, and changes the frequency by the descending order change pattern using the other frame of the odd number or the even number (see FIG. 16A).

Thus, the frequency change is performed so that the frequency in the ascending order change pattern and the frequency in the descending order change pattern are alternately switched, and the time difference between the ascending order change pattern side and the descending order change pattern side is reduced. That is, under a change in the distance to another communication device, the difference in the distance between the time of setting the frequency in the ascending order change pattern and the time of setting the frequency in the descending order change pattern is suppressed.

Therefore, the distance measurement accuracy can be improved.

Furthermore, in the communication device as the embodiment, the distance calculation unit calculates the distance on the basis of an inclination of a phase with respect to a frequency of the signal propagation path obtained with respect to the ascending order change of the frequency and the inclination obtained with respect to the descending order change of the frequency.

When the distance to another communication device changes, in a case where the frequency is changed in ascending order, the inclination of the phase with respect to the frequency is steeper than the inclination in a case where there is no distance change, and on the other hand, in a case where the frequency is changed in descending order, the inclination is gentler than the inclination in a case where there is no distance change. Therefore, it is possible to appropriately obtain the distance in a case where there is a distance change by performing distance calculation based on both phase characteristics, such as taking an average of the inclination when changing in ascending order and the inclination when changing in descending order.

Therefore, it is possible to improve the distance measurement accuracy in a case where there is a distance change.

Moreover, in the communication device as the embodiment, the distance calculation unit calculates the distance on the basis of an average value of the inclination obtained with respect to the ascending order change of the frequency and the inclination obtained with respect to the descending order change of the frequency.

This makes it possible to appropriately obtain the distance in a case where there is a distance change.

Therefore, it is possible to improve the distance measurement accuracy in a case where there is a distance change.

Furthermore, in the communication device as the embodiment, the distance calculation unit averages a distance calculated on the basis of the phase characteristic obtained with respect to the ascending order change of the frequency and a distance calculated on the basis of the phase characteristic obtained with respect to the descending order change of the frequency (see FIG. 11).

When the distance to another communication device changes, in a case where the frequency is changed in ascending order, one of positive and negative offsets is superimposed on the distance obtained on the basis of the phase characteristic, and in a case where the frequency is changed in descending order, the other of the positive and negative offsets is superimposed on the distance obtained on the basis of the phase characteristic. Therefore, by averaging the distance when changing in the ascending order and the distance when changing in the descending order, it is possible to appropriately obtain the distance in a case where there is a distance change.

Therefore, it is possible to improve the distance measurement accuracy in a case where there is a distance change.

Furthermore, in the communication device as the embodiment, the phase characteristic acquisition unit performs a random characteristic acquisition process of acquiring the phase characteristic by changing the frequency by a frequency change pattern including a random change of the frequency (see FIG. 13).

When the distance to another communication device changes, it is possible to appropriately obtain the distance in a case where there is a distance change by calculating the distance on the basis of the phase characteristic obtained by randomly changing the frequency.

Therefore, it is possible to improve the distance measurement accuracy in a case where there is a distance change.

Moreover, in the communication device as the embodiment, the distance calculation unit calculates the distance on the basis of each of the phase characteristics acquired by the phase characteristic acquisition unit performing the random characteristic acquisition process a plurality of times.

With regard to the random characteristic acquisition process, by performing a plurality of processes to obtain a plurality of phase characteristics, it is possible to improve the accuracy of the distance by performing distance calculation based on the plurality of phase characteristics, such as obtaining the distance by averaging the plurality of phase characteristics.

Therefore, it is possible to improve the distance measurement accuracy in a case where there is a distance change.

Furthermore, in the communication device as the embodiment, the phase characteristic acquisition unit acquires the phase characteristic by changing a frequency by a frequency change pattern in which a part is changed by a random pattern and another part is changed by a non-random pattern (see FIGS. 16C and 16D).

Even in a case where the random change of the frequency is only a part, it is possible to appropriately obtain the distance in a case where there is a distance change.

Therefore, it is possible to improve the distance measurement accuracy in a case where there is a distance change.

Furthermore, in the communication device as the embodiment, the phase characteristic acquisition unit performs a process of acquiring an inclination of a phase with respect to a frequency of the signal propagation path as the random characteristic acquisition process, and the distance calculation unit calculates the distance on the basis of an average value of the inclinations acquired by the phase characteristic acquisition unit performing the random characteristic acquisition process a plurality of times.

Thus, it is possible to appropriately obtain the distance in a case where there is a distance change corresponding to a case where the frequency is randomly changed.

Therefore, it is possible to improve the distance measurement accuracy in a case where there is a distance change.

Moreover, in the communication device as the embodiment, the distance calculation unit averages distances calculated from the respective phase characteristics acquired by the phase characteristic acquisition unit performing the random characteristic acquisition process a plurality of times.

Thus, it is possible to appropriately obtain the distance in a case where there is a distance change corresponding to a case where the frequency is randomly changed.

Therefore, it is possible to improve the distance measurement accuracy in a case where there is a distance change.

Furthermore, the communication device (the same 1A) as the embodiment includes a motion sensor (the same 20) that detects a motion of the communication device, and the phase characteristic acquisition unit (frequency-related phase characteristic acquisition unit F1A) changes the frequency change pattern on the basis of information of a moving speed of the communication device obtained on the basis of an output of the motion sensor.

Thus, the frequency change pattern can be changed according to the presence or absence of a distance change with respect to another communication device.

Therefore, for example, the distance measurement can be performed by an appropriate method according to the presence or absence of the distance change, such as performing the distance measurement in which the frequency is changed by the frequency change pattern including the upward-side change and the downward-side change only in a case where the distance change is recognized.

Furthermore, in the communication device as the embodiment, the phase characteristic acquisition unit changes the frequency by a frequency change pattern including the upward-side change and the downward-side change in a case where the moving speed is equal to or more than a predetermined speed, and changes the frequency by a frequency change pattern including only the upward-side change or only the downward-side change in a case where the moving speed is not equal to or more than the predetermined speed.

Thus, it is possible to perform distance measurement in which the frequency is changed by the frequency change pattern including the upward-side change and the downward-side change only in a case where a distance change is recognized.

Therefore, distance measurement can be performed by an appropriate method according to the presence or absence of a distance change.

In addition, a distance measurement method as an embodiment is a distance measurement method in which a communication device includes a phase characteristic acquisition procedure in which a communication device acquires a phase characteristic with respect to a frequency of a signal propagation path with another communication device, and a distance calculation procedure in which the communication device calculates a distance to the another communication device on the basis of the phase characteristic, in which in the phase characteristic acquisition procedure, the phase characteristic is acquired by changing the frequency by a frequency change pattern including at least an upward-side change and a downward-side change.

With such a distance measurement method, functions and effects similar to functions and effects of the communication device as the embodiment described above can be obtained.

Note that the effects described in the present specification are merely examples and are not limited, and other effects may be provided.

6. Present Technology

Note that the present technology can also employ the following configurations.

(1)

A communication device, including:

a phase characteristic acquisition unit that acquires a phase characteristic with respect to a frequency of a signal propagation path with another communication device; and a distance calculation unit that calculates a distance to the another communication device on the basis of the phase characteristic, in which the phase characteristic acquisition unit acquires the phase characteristic by changing the frequency by a frequency change pattern including at least an upward-side change and a downward-side change.

(2)

The communication device according to (1) above, in which the phase characteristic acquisition unit performs an ascending order characteristic acquisition process of acquiring the phase characteristic by changing the frequency by an ascending order change pattern for changing the frequency in a predetermined frequency band in ascending order and a descending order characteristic acquisition process of acquiring the phase characteristic by changing the frequency by a descending order change pattern for changing the frequency in the predetermined frequency band in descending order, and the distance calculation unit calculates the distance on the basis of the phase characteristic acquired in the ascending order characteristic acquisition process and the phase characteristic acquired in the descending order characteristic acquisition process.

(3)

The communication device according to (2) above, in which the phase characteristic acquisition unit changes the frequency by one pattern and then changes the frequency by the other pattern with respect to the ascending order change pattern and the descending order change pattern.

(4)

The communication device according to (2) above, in which when an output period of a single frequency in a process of frequency change is set to one frame, the phase characteristic acquisition unit changes the frequency by the ascending order change pattern using one frame of an odd number or an even number, and changes the frequency by the descending order change pattern using the other frame of the odd number or the even number.

(5)

The communication device according to any one of (2) to (4) above, in which the distance calculation unit calculates the distance on the basis of an inclination of a phase with respect to a frequency of the signal propagation path obtained with respect to the ascending order change of the frequency and the inclination obtained with respect to the descending order change of the frequency.

(6)

The communication device according to (5) above, in which the distance calculation unit calculates the distance on the basis of an average value of the inclination obtained with respect to the ascending order change of the frequency and the inclination obtained with respect to the descending order change of the frequency.

(7)

The communication device according to any one of (2) to (4) above, in which the distance calculation unit averages a distance calculated on the basis of the phase characteristic obtained with respect to the ascending order change of the frequency and a distance calculated on the basis of the phase characteristic obtained with respect to the descending order change of the frequency.

(8)

The communication device according to (1) above, in which the phase characteristic acquisition unit performs a random characteristic acquisition process of acquiring the phase characteristic by changing the frequency by a frequency change pattern including a random change of the frequency.

(9)

The communication device according to (8) above, in which the distance calculation unit calculates the distance on the basis of each of the phase characteristics acquired by the phase characteristic acquisition unit performing the random characteristic acquisition process a plurality of times.

(10)

The communication device according to (8) or (9) above, in which the phase characteristic acquisition unit acquires the phase characteristic by changing a frequency by a frequency change pattern in which a part is changed by a random pattern and another part is changed by a non-random pattern.

(11)

The communication device according to any one of (8) to (10) above, in which the phase characteristic acquisition unit performs a process of acquiring an inclination of a phase with respect to a frequency of the signal propagation path as the random characteristic acquisition process, and the distance calculation unit calculates the distance on the basis of an average value of the inclinations acquired by the phase characteristic acquisition unit performing the random characteristic acquisition process a plurality of times.

(12)

The communication device according to any one of (8) to (10) above, in which the distance calculation unit averages distances calculated from the respective phase characteristics acquired by the phase characteristic acquisition unit performing the random characteristic acquisition process a plurality of times.

(13)

The communication device according to any one of (1) to (12) above, further including:

a motion sensor that detects a motion of the communication device, in which the phase characteristic acquisition unit changes the frequency change pattern on the basis of information of a moving speed of the communication device obtained on the basis of an output of the motion sensor.

(14)

The communication device according to (13) above, in which the phase characteristic acquisition unit changes the frequency by a frequency change pattern including the upward-side change and the downward-side change in a case where the moving speed is equal to or more than a predetermined speed, and changes the frequency by a frequency change pattern including only the upward-side change or only the downward-side change in a case where the moving speed is not equal to or more than the predetermined speed.

(15)

A distance measurement method, including:

a phase characteristic acquisition procedure in which a communication device acquires a phase characteristic with respect to a frequency of a signal propagation path with another communication device; and a distance calculation procedure in which the communication device calculates a distance to the another communication device on the basis of the phase characteristic, in which in the phase characteristic acquisition procedure, the phase characteristic is acquired by changing the frequency by a frequency change pattern including at least an upward-side change and a downward-side change.

REFERENCE SIGNS LIST

1, 1A Communication device
2 Modulator
3 DAC
4 Transmission unit
5 BPF
6 Mixer
7 Frequency synthesizer
8 RF switch
9 Antenna
10 Reception unit
11 LNA
12 Mixer
13, 15 BPF
14, 16 VGA
17 ADC
18, 18A Calculation unit
20 Motion sensor
100 Initiator
200 Reflector
F1, F1A Frequency-related phase characteristic acquisition unit
F2 Distance calculation unit

The invention claimed is:

1. A communication device, comprising:

a phase characteristic acquisition unit that acquires a phase characteristic with respect to a frequency of a signal propagation path with another communication device; and a distance calculation unit that calculates a distance to the another communication device on a basis of the phase characteristic, wherein the phase characteristic acquisition unit acquires the phase characteristic by changing the frequency by a frequency change pattern including at least an upward-side change and a downward-side change, the frequency change pattern being executed as an ascending-order frequency sweep and a descending-order frequency sweep performed in sequence.

2. A communication device comprising:

a phase characteristic acquisition unit that acquires a phase characteristic with respect to a frequency of a signal propagation path with another communication device; and a distance calculation unit that calculates a distance to the another communication device on a basis of the phase characteristic, wherein the phase characteristic acquisition unit acquires the phase characteristic by changing the frequency by a frequency change pattern including at least an upward-side change and a downward- side change, the phase characteristic acquisition unit performs an ascending order characteristic acquisition process of acquiring the phase characteristic by changing the frequency by an ascending order change pattern for changing the frequency in a predetermined frequency band in ascending order and a descending order characteristic acquisition process of acquiring the phase characteristic by changing the frequency by a descending order change pattern for changing the frequency in the predetermined frequency band in descending order, and the distance calculation unit calculates the distance on a basis of the phase characteristic acquired in the ascending order characteristic acquisition process and the phase characteristic acquired in the descending order characteristic acquisition process.

3. The communication device according to claim 2, wherein the phase characteristic acquisition unit changes the frequency by a first of the ascending order change pattern or the descending order change pattern and then changes the frequency by a second of the ascending order change pattern or the descending order change pattern.

4. The communication device according to claim 2, wherein when an output period of a single frequency in a process of frequency change is set to one frame, the phase characteristic acquisition unit changes the frequency by the ascending order change pattern using one of an odd number frame or an even number frame an even number, and changes the frequency by the descending order change pattern using an other of the odd number frame or the even number frame.

5. The communication device according to claim 2, wherein the distance calculation unit calculates the distance on a basis of an inclination of a phase with respect to a frequency of the signal propagation path obtained with respect to the ascending order change of the frequency and the inclination obtained with respect to the descending order change of the frequency.

6. The communication device according to claim 5, wherein the distance calculation unit calculates the distance on a basis of an average value of the inclination obtained with respect to the ascending order change of the frequency and the inclination obtained with respect to the descending order change of the frequency.

7. The communication device according to claim 2, wherein the distance calculation unit averages a distance calculated on a basis of the phase characteristic obtained with respect to the ascending order change of the frequency and a distance calculated on a basis of the phase characteristic obtained with respect to the descending order change of the frequency.

8. The communication device according to claim 1, wherein the phase characteristic acquisition unit performs a random characteristic acquisition process of acquiring the phase characteristic by changing the frequency by a frequency change pattern including a random change in which respective frequencies are selected in a randomly ordered sequence with the frequency change.

9. The communication device according to claim 8, wherein the distance calculation unit calculates the distance on a basis of each of the phase characteristics acquired by the phase characteristic acquisition unit performing the random characteristic acquisition process a plurality of times.

10. The communication device according to claim 8, wherein the phase characteristic acquisition unit acquires the phase characteristic by changing a frequency by a frequency change pattern in which a part is changed by a random pattern and another part is changed by a non-random pattern.

11. The communication device according to claim 8, wherein the phase characteristic acquisition unit performs a process of acquiring an inclination of a phase with respect to a frequency of the signal propagation path as the random characteristic acquisition process, and the distance calculation unit calculates the distance on a basis of an average value of the inclinations acquired by the phase characteristic acquisition unit performing the random characteristic acquisition process a plurality of times.

12. The communication device according to claim 8, wherein the distance calculation unit averages distances calculated from the respective phase characteristics acquired by the phase characteristic acquisition unit performing the random characteristic acquisition process a plurality of times.

13. The communication device according to claim 1, further comprising:

a motion sensor that detects a motion of the communication device, wherein the phase characteristic acquisition unit changes the frequency change pattern on a basis of information of a moving speed of the communication device obtained on a basis of an output of the motion sensor.

14. The communication device according to claim 13, wherein the phase characteristic acquisition unit changes the frequency by a frequency change pattern including the upward-side change and the downward-side change in a case where the moving speed is equal to or more than a predetermined speed, and changes the frequency by a frequency change pattern including only the upward-side change or only the downward-side change in a case where the moving speed is not equal to or more than the predetermined speed.

15. A non-transitory computer readable medium storing a program for controlling a communication device, the program being executable by a processor to perform operations comprising:

acquires a phase characteristic with respect to a frequency of a signal propagation path with another communication device;

calculating a distance to the another communication device on a basis of the phase characteristic; and changing the frequency by a frequency change pattern including at least an upward-side change and a downward-side change, the frequency change pattern being executed as an ascending-order frequency sweep and a descending-order frequency sweep performed in sequence.

16. The non-transitory computer readable medium according to claim 15, wherein the operations further comprise:

performing a random characteristic acquisition process of acquiring the phase characteristic by changing the frequency by a frequency change pattern including a random change in which respective frequencies are selected in a randomly ordered sequence with the frequency change.

17. A non-transitory computer readable medium storing a program for controlling a communication device, the program being executable by a processor to perform operations comprising:

acquiring a phase characteristic with respect to a frequency of a signal propagation path with another communication device;

calculating a distance to the another communication device on a basis of the phase characteristic;

changing the frequency by a frequency change pattern including at least an upward-side change and a downward-side change;

performing an ascending order characteristic acquisition process of acquiring the phase characteristic by changing the frequency by an ascending order change pattern for changing the frequency in a predetermined frequency band in ascending order and a descending order characteristic acquisition process of acquiring the phase characteristic by changing the frequency by a descending order change pattern for changing the frequency in the predetermined frequency band in descending order; and calculating the distance on a basis of the phase characteristic acquired in the ascending order characteristic acquisition process and the phase characteristic acquired in the descending order characteristic acquisition process.

18. The non-transitory computer readable medium according to claim 17, wherein the operations further comprise:

changing the frequency by a first of the ascending order change pattern or the descending order change pattern and then changing the frequency by a second of the ascending order change pattern and the descending order change pattern.

19. The non-transitory computer readable medium according to claim 17, wherein the operations further comprise:

when an output period of a single frequency in a process of frequency change is set to one frame, changing the frequency by the ascending order change pattern using one of an odd number frame or an even number frame, and changing the frequency by the descending order change pattern using an other of the odd number frame or the even number frame.

20. The non-transitory computer readable medium according to claim 17, wherein the operations further comprise:

calculating the distance on a basis of an inclination of a phase with respect to a frequency of the signal propagation path obtained with respect to the ascending order change of the frequency and the inclination obtained with respect to the descending order change of the frequency.

\* \* \* \* \*